United States Patent
Zhuang et al.

(10) Patent No.: US 9,794,865 B2
(45) Date of Patent: Oct. 17, 2017

(54) METHODS, DEVICES, AND SYSTEMS FOR REGISTERING AND DISCOVERING SERVICE

(71) Applicant: Huawei Technologies Co., Ltd., Shenzhen (CN)

(72) Inventors: Yan Zhuang, Nanjing (CN); Yungui Wang, Nanjing (CN); Yingjie Gu, Nanjing (CN); Fuqing Sun, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/587,213

(22) Filed: Dec. 31, 2014

(65) Prior Publication Data

US 2015/0117430 A1 Apr. 30, 2015

Related U.S. Application Data

(63) Continuation of application No. PCT/CN2012/078314, filed on Jul. 6, 2012.

(51) Int. Cl.
*G01R 31/08* (2006.01)
*H04W 48/16* (2009.01)
*H04L 29/08* (2006.01)

(52) U.S. Cl.
CPC ............ *H04W 48/16* (2013.01); *H04L 67/16* (2013.01)

(58) Field of Classification Search
USPC ....... 370/312, 203, 254, 255, 331, 338, 389, 370/400, 475
See application file for complete search history.

(56) References Cited

U.S. PATENT DOCUMENTS

| 2005/0078644 | A1* | 4/2005 | Tsai ........................ H04L 29/06 370/338 |
| 2006/0217147 | A1 | 9/2006 | Olvera-Hernandez et al. |
| 2008/0221988 | A1* | 9/2008 | Bappu ................ G06Q 30/0239 705/14.39 |
| 2010/0322213 | A1 | 12/2010 | Liu et al. |
| 2011/0149806 | A1 | 6/2011 | Verma et al. |

(Continued)

FOREIGN PATENT DOCUMENTS

| CN | 1894899 A | 1/2007 |
| CN | 102325352 A | 1/2012 |
| EP | 2034661 A1 | 3/2009 |

(Continued)

OTHER PUBLICATIONS

Partial English Translation and Abstract of Japanese Patent Application No. JPA2011-511588, Mar. 30, 2016, 15 pages.

(Continued)

*Primary Examiner* — Phuongchau Ba Nguyen
(74) *Attorney, Agent, or Firm* — Conley Rose, P.C.

(57) ABSTRACT

Methods, devices, and systems for registering and discovering a service. An access point (AP) may receive and maintain service information registered by an associated station (STA), and serve as a proxy for a STA to discover service information in a network, and further discover a direct association service and manage direct communication between STAs, thereby meeting a user's demand of selecting a network according to a service requirement.

13 Claims, 23 Drawing Sheets

(56) References Cited

U.S. PATENT DOCUMENTS

2014/0206349 A1* 7/2014 Bertrand ............ H04W 40/246
　　　　　　　　　　　　　　　　　　　　　　　　455/434

FOREIGN PATENT DOCUMENTS

| JP | 20110511588 A | 4/2011 |
|---|---|---|
| WO | 2009117472 A2 | 9/2009 |
| WO | 2011073516 A1 | 6/2011 |

OTHER PUBLICATIONS

Foreign Communication From a Counterpart Application, Japanese Application No. 2015-518775, Japanese Office Action dated Jan. 5, 2016, 4 pages.

Foreign Communication From a Counterpart Application, Japanese Application No. 2015-518775, English Translation of Japanese Office Action dated Jan. 5, 2016, 6 pages.

Foreign Communication From a Counterpart Application, European Application No. 12880569.4, Partial Supplementary European Search Report dated Jun. 14, 2015, 5 pages.

"ISD SG Use Cases & Requirements," IEEE P802.11/0433r2, Wireless LANs, May 15, 2012, 7 pages.

"Wi-Fi P2P Training," Wi-Fi Alliance Proprietary, Mar. 2010, 96 pages.

Foreign Communication From a Counterpart Application, PCT Application No. PCT/CN2012/078314, English of International Search Report dated Apr. 18, 2013, 2 pages.

Foreign Communication From a Counterpart Application, PCT Application No. PCT/CN2012/078314, English Translation of Written Opinion dated Apr. 18, 2013, 7 pages.

* cited by examiner

| Management frame header | Category | Public Action field value | Action Detail |
|---|---|---|---|

| Query Type Name | Query Type Identifier |
|---|---|
| Query list | 0 |
| Result list (Content list) | 1 |
| BSSID | 2 |
| Device name | 3 |
| Service name | 4 |
| Device identifier | 5 |
| Service identifier | 6 |
| Device capability | 7 |
| Network access policy | 8 |
| ... | ... |

| BSSID | Service Name | Service Identifier | Service Description | Device Name | Device identifier | Device Capability | Device Description | Network Access Policy |
|---|---|---|---|---|---|---|---|---|
| BSSID-1 | Flight ticket booking | SI-1 | China Southern Airlines only | Ticket Center No. 2 | DI-1 | Providing door-to-door service | Business hours 8:00 to 19:00 | Policy 1 |
| BSSID-1 | Train ticket booking | SI-2 | CRH ticket only | Ticket Center No. 2 | DI-1 | Providing door-to-door service | Business hours 8:00 to 19:00 | |
| BSSID-1 | Printing | SI-3 | Color printing | Printer No. 1 | DI-2 | Supporting WiFi Direct | Photo printer | Policy 2 |
| ... | ... | ... | ... | ... | ... | ... | | |

FIG. 23

| BSSID | Service Identifier | Service Description | Device Name | Device identifier | Device Description | Network Access Policy |
|---|---|---|---|---|---|---|
FIG. 24
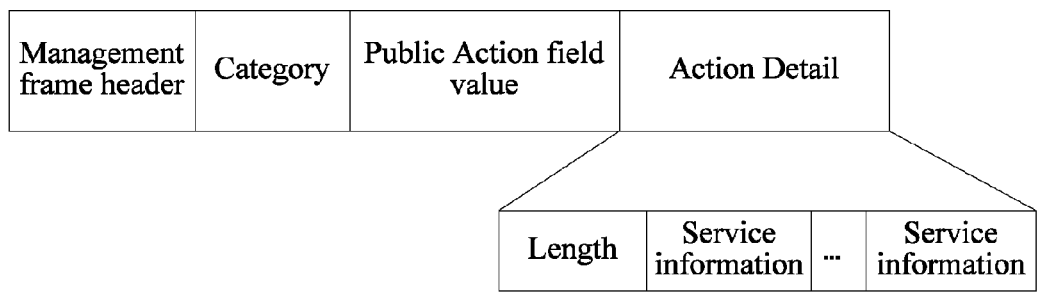
FIG. 25
| Element ID | Length | Network type | Service directory item | ... | Service directory item |
|---|---|---|---|---|---|
| BSSID | Service Identifier | Service Name | Service Description |
|---|---|---|---|
FIG. 26
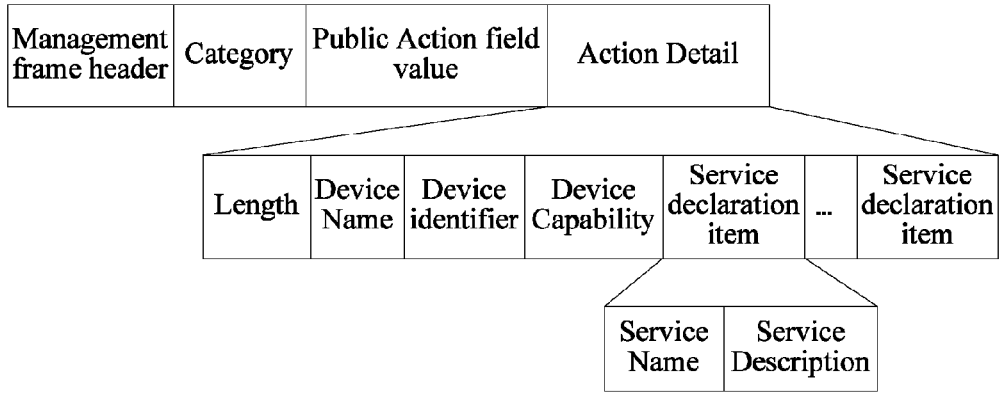
FIG. 27

| Service Name | Group address | Channel information | Group identifier | Service Identifier | Device Name |
|---|---|---|---|---|---|
| Printing | MAC2 | Channel 1 | Group 1 | SI-3 | Printer 1 |
| ... | ... | ... | ... | ... | ... |

METHODS, DEVICES, AND SYSTEMS FOR REGISTERING AND DISCOVERING SERVICE

CROSS-REFERENCE TO RELATED APPLICATION

This application is a continuation of International Application No. PCT/CN2012/078314, filed on Jul. 6, 2012, which is hereby incorporated by reference in its entirety.

TECHNICAL FIELD

Embodiments of the present invention relate to the field of network communications, and in particular, to methods, devices, and systems for registering and discovering a service.

BACKGROUND

A wireless local area network (WLAN) based on the Institute of Electrical and Electronics Engineers (IEEE) 802.11 is a local area network in which a radio frequency technology is adopted and a wireless channel is used as a transmission medium. A station (STA), an access point (AP), and the like are usually included in a WLAN. A STA refers to a device having a wireless local area network interface. In addition to functions of a STA, an AP may further be connected to a distribution system through an interface provided to an associated STA by a wireless medium, and is responsible for implementing communication between STAs or between a STA and a wired network. Multiple STAs may be associated with a same AP.

Before accessing a WLAN, a STA first needs to search for a network in a region in which the STA is located, discovers an available AP, and is associated with the discovered available AP. An available AP is usually discovered in two manners: active scanning and passive scanning.

Active scanning manner: A STA broadcasts a probe request frame on all channels and actively scans for an available AP on a channel, and receives a probe response frame returned by an available AP, to obtain information about the available AP.

Passive scanning manner: An AP periodically sends a beacon frame, and a STA performs listening channel by channel to capture a beacon frame sent by an AP, to obtain information about an available AP.

All STAs associated with a same AP and the AP together form one basic service set (BSS). A BSS may be identified by a basic service set identifier (BSSID). A BSSID is usually a media access control (MAC) address of an AP.

A wireless fidelity (Wi-Fi) technology is a short-range wireless communication technology. Based on advantages such as convenient use and a high transmission rate, the wireless fidelity technology is widely applied in aspects of both construction of a WLAN and access to a wide area network. In recent years, with ongoing popularization and rapid growth of various terminal devices, such as a notebook computer and a mobile phone, which support the Wi-Fi technology, a WLAN technology has become an important technology for industrial informatization, home informatization, and individual informatization, is widely applied to various sites such as enterprises, homes, campuses, and hospitals, and brings about various WLAN-related service requirements and user experience requirements. Current research focuses of the WLAN technology are as follows: For example, in a high-density service scenario with complex service classification and centralized deployment, one focus is how a user discovers a service that can be provided by a network and rapidly and effectively accesses a corresponding network according to a service, for example, printing, which the user requires. Further, another focus is how to discover a device capability such as support of Wi-Fi Direct and Bluetooth when the user discovers a required service and intends to perform direct interaction through Wi-Fi with a device providing the service.

Currently, device discovery and establishment of a point-to-point (P2P) direct association may be performed using a Wi-Fi Direct technology, and content and the like may be shared, presented, printed, and synchronized between devices. The core of the Wi-Fi Direct technology is that, required devices are discovered among devices in a P2P manner, so that devices construct or join a group and connections are established among the devices, and subsequently communication is performed inside the group. The Wi-Fi Direct technology provides near-field device discovery, in which only device-based discovery and search can be provided, and a device needs to periodically listen on a channel to respond to device discovery and information sharing. Therefore, limited by a distance between devices, the Wi-Fi Direct technology cannot provide service-based discovery and search, and a device needs to consume a lot of resources to listen on a channel.

SUMMARY

In view of this, embodiments of the present invention provide methods, devices, and systems for registering and discovering a service, in which an AP receives and maintains service information declared by a STA, and serves as a proxy for the STA to discover service information in a network and also discover a direct association service and manage direct communication between STAs, thereby meeting a user's demand of selecting a network according to a service requirement.

In a first aspect, a method for discovering a service is provided and includes receiving, by a first AP, a service discovery request frame from a first STA, where the service discovery request frame includes M service query items, and M is an integer greater than or equal to 0; querying a service information table of the first AP according to the service discovery request frame, and obtaining a query result that meets the M service query items; and returning a service discovery response frame to the first STA, where the service discovery response frame includes the query result.

In a first possible implementation manner of the first aspect, the obtaining a query result that meets the M service query items includes obtaining the query result that meets the M service query items and is in the service information table of the first AP.

In a second possible implementation manner of the first aspect, the obtaining a query result that meets the M service query items includes obtaining all service information that meets the M service query items and is in the service information table of the first AP; and forwarding the service discovery request frame to a second AP, and receiving a service discovery response frame returned by the second AP, where the service discovery response frame returned by the second AP includes all service information that meets the M service query items and is in a service information table of the second AP; the query result includes all the service information that meets the M service query items and is in the service information table of the first AP, and the service information included in the service discovery response frame returned by the second AP.

In a third possible implementation manner of the first aspect, the obtaining a query result that meets the M service query items includes, when at least one piece of service information existing in the service information table of the first AP meets the M service query items, obtaining all service information that meets the M service query items and is in the service information table of the first AP; or when none of service information in the service information table of the first AP meets the M service query items, forwarding the service discovery request frame to a second AP, receiving a service discovery response frame returned by the second AP, where the service discovery response frame returned by the second AP includes all service information that meets the M service query items and is in a service information table of the second AP, and obtaining the service information included in the service discovery response frame returned by the second AP.

According to any one of the first aspect and the first to third possible implementation manners of the first aspect, in a fourth possible implementation manner, before the receiving, by a first AP, a service discovery request frame from a first STA, the method further includes receiving, by the first AP, a probe request frame sent in a broadcast manner by the first STA, where the probe request frame includes a service information element; and returning a probe response frame to the first STA, where the probe response frame includes the service information element, and the service information element includes a service directory item.

According to any one of the first aspect and the first to third possible implementation manners of the first aspect, in a fifth possible implementation manner, before the receiving, by a first AP, a service discovery request frame from a first STA, the method further includes sending, by the first AP, a beacon frame in a broadcast manner, where the beacon frame includes a service information element, and the service information element includes a service directory item.

In a second aspect, a method for discovering a service is provided and includes sending, by a first STA, a service discovery request frame to a first AP, where the service discovery request frame includes M service query items, and M is an integer greater than or equal to 0; and receiving a service discovery response frame returned by the first AP, where the service discovery response frame includes a query result that meets the M service query items.

In a first possible implementation manner of the second aspect, before the sending, by a first STA, a service discovery request frame to a first AP, the method further includes sending, by the first STA, a probe request frame in a broadcast manner, where the probe request frame includes a service information element; and receiving a probe response frame returned by the first AP, where the probe response frame includes the service information element, and the service information element includes a service directory item.

In a second possible implementation manner of the second aspect, before the sending, by a first STA, a service discovery request frame to a first AP, the method further includes receiving a beacon frame sent in a broadcast manner by the first AP, where the beacon frame includes a service information element, and the service information element includes a service directory item.

In a third aspect, a first AP for discovering a service is provided and includes a receiving unit configured to receive a service discovery request frame from a first STA, where the service discovery request frame includes M service query items, and M is an integer greater than or equal to 0; a query unit configured to query a service information table of the first AP according to the service discovery request frame, and obtain a query result that meets the M service query items; and a sending unit configured to return a service discovery response frame to the first STA, where the service discovery response frame includes the query result.

In a first possible implementation manner of the third aspect, the query unit includes a local subunit configured to query the service information table of the first AP according to the service discovery request frame, and obtain all service information that meets the M service query items and is in the service information table of the first AP; a remote subunit configured to forward the service discovery request frame to a second AP, receive a service discovery response frame returned by the second AP, where the service discovery response frame returned by the second AP includes all service information that meets the M service query items and is in a service information table of the second AP, and obtain the service information included in the service discovery response frame returned by the second AP; and a result obtaining subunit configured to obtain the query result that meets the M service query items, where the query result includes the service information obtained by the local subunit and the service information obtained by the remote subunit.

In a second possible implementation manner of the third aspect, the query unit includes a search subunit configured to query the service information table of the first AP according to the service discovery request frame; a remote subunit configured to, when a search result of the search subunit is that none of service information in the service information table of the first AP meets the M service query items, forward the service discovery request frame to a second AP, receive a service discovery response frame returned by the second AP, where the service discovery response frame returned by the second AP includes all service information that meets the M service query items and is in a service information table of the second AP, and obtain the service information included in the service discovery response frame returned by the second AP; and a local subunit configured to, when a search result of the search subunit is that at least one piece of service information existing in the service information table of the first AP meets the M service query items, obtain all service information that meets the M service query items and is in the service information table of the first AP.

According to any one of the third aspect and all the possible implementation manners of the third aspect, in a third possible implementation manner, the first AP further includes a scanning unit, where the scanning unit is configured to send a beacon frame in a broadcast manner, where the beacon frame includes a service information element, and the service information element includes a service directory item; or, the scanning unit is configured to receive a probe request frame sent in a broadcast manner by the first STA, and return a probe response frame to the first STA, where the probe request frame includes a service information element, the probe response frame includes the service information element, and the service information element includes a service directory item.

In a fourth aspect, a first STA for discovering a service is provided and includes a sending unit configured to send a service discovery request frame to a first AP, where the service discovery request frame includes M service query items; and a receiving unit configured to receive a service discovery response frame returned by the first AP, where the service discovery response frame includes a query result that meets the M service query items.

In a first possible implementation manner of the fourth aspect, the first STA further includes a scanning unit, where the scanning unit is configured to receive a beacon frame sent in a broadcast manner by the first AP, where the beacon frame includes a service information element, and the service information element includes a service directory item; or, the scanning unit is configured to send a probe request frame in a broadcast manner, and receive a probe response frame returned by the first AP, where the probe request frame includes a service information element, the probe response frame includes the service information element, and the service information element includes a service directory item.

In a fifth aspect, a method for registering a service is provided and includes receiving, by a first AP, a service announcement request frame from a first STA, where the service announcement request frame includes a device address of the first STA and at least one service declaration item, and the service declaration item includes a service name; obtaining a device identifier of the first STA; obtaining, according to the at least one service declaration item, a service identifier corresponding to each of the at least one service declaration item; recording, in a service information table of the first AP, service information corresponding to each of the at least one service declaration item, where the service information includes a BSSID, a device identifier, a service identifier, and a service declaration item; and returning a service announcement response frame to the first STA, where the service announcement response frame includes the device identifier of the first STA and a service declaration acknowledgment item corresponding to each of the at least one service declaration item, and each of at least one service declaration acknowledgment item includes a service identifier and a service name.

In a first possible implementation manner of the fifth aspect, the obtaining a device identifier of the first STA includes querying an address correspondence table of the first AP according to the device address of the first STA, where the address correspondence table includes a correspondence between a device address and a device identifier; and when a device address in one existing address correspondence in the address correspondence table of the first AP is the same as the device address of the first STA, obtaining a device identifier in the existing address correspondence, that is, the device identifier of the first STA; or when a device address in any address correspondence in the address correspondence table of the first AP is different from the device address of the first STA, allocating the device identifier of the first STA from a device identifier pool, and recording, in the address correspondence table, an address correspondence between the device address of the first STA and the device identifier of the first STA.

In a second possible implementation manner of the fifth aspect, the service announcement request frame further includes the device identifier of the first STA; and correspondingly, the obtaining a device identifier of the first STA includes obtaining the device identifier of the first STA from the service announcement request frame.

According to the fifth aspect or the first or second possible implementation manner of the fifth aspect, in a third possible implementation manner, the obtaining, according to the at least one service declaration item, a service identifier corresponding to each of the at least one service declaration item includes querying, by the first AP, the service information table of the first AP according to a service name of a first service declaration item in the at least one service declaration item; and when a service name in any piece of service information in the service information table of the first AP is different from the service name of the first service declaration item, allocating a first service identifier according to the service name of the first service declaration item; or when a service name in existing service information existing in the service information table of the first AP is the same as the service name of the first service declaration item, obtaining a service identifier of the existing service information, that is, a first service identifier corresponding to the service name of the first service declaration item.

According to the third possible implementation manner of the fifth aspect, in a fourth possible implementation manner, the recording, in a service information table of the first AP, service information corresponding to each of the at least one service declaration item includes obtaining, by the first AP, first service information, where the first service information includes a BSSID of the first AP, the device identifier of the first STA, the first service identifier, and the first service declaration item; and recording the first service information in the service information table of the first AP.

According to any one of the fifth aspect and the first to fourth possible implementation manners of the fifth aspect, in a fifth possible implementation manner, the method further includes sending, by the first AP, a first service maintenance frame to a second AP, where the first service maintenance frame includes a first maintenance state and the service information corresponding to each of the at least one service declaration item, so that the second AP updates a service information table of the second AP.

According to any one of the fifth aspect and the first to fifth possible implementation manners of the fifth aspect, in a sixth possible implementation manner, the method further includes receiving, by the first AP, a second service maintenance frame from the first STA, where the second service maintenance frame includes a second maintenance state and at least one service maintenance item, and each of at least one service maintenance item includes a BSSID, a device identifier, and a service identifier; and updating, by the first AP, the service information table of the first AP according to the second service maintenance frame.

According to any one of the fifth aspect and the first to fifth possible implementation manners of the fifth aspect, in a seventh possible implementation manner, the method further includes sensing, by the first AP, that the first STA is disassociated; and deleting, from the service information table of the first AP, all service information declared by the first STA.

According to any one of the fifth aspect and all possible implementation manners of the fifth aspect, in an eighth possible implementation manner, the method further includes receiving, by the first AP, a third service maintenance frame, where the third service maintenance frame includes a first maintenance state and at least one piece of service information, or a second maintenance state and at least one service maintenance item; and updating, by the first AP, the service information table of the first AP according to the third service maintenance frame.

In a sixth aspect, a method for registering a service is provided and includes sending, by a first STA, a service announcement request frame to a first AP, where the service announcement request frame includes a device address of the first STA and at least one service declaration item, and each of at least one service declaration item includes a service name; and receiving a service announcement response frame from the first AP, where the service announcement response frame includes a device identifier of the first STA and a service declaration acknowledgment item corresponding to each of the at least one service declaration item, and the service declaration acknowledgment item includes a service identifier and a service name.

In a first possible implementation manner of the sixth aspect, the method further includes sending, by the first STA, a service maintenance frame to the first AP, so that the first AP updates a service information table of the first AP according to the service maintenance frame, where the service maintenance frame includes a second maintenance state and at least one service maintenance item, and each of at least one service maintenance item includes a BSSID, the device identifier, and the service identifier.

In a seventh aspect, a first AP for registering a service is provided and includes a receiving unit configured to receive a service announcement request frame from a first STA, where the service announcement request frame includes a device address of the first STA and at least one service declaration item, and each of at least one service declaration item includes a service name; a first obtaining unit configured to obtain a device identifier of the first STA; a second obtaining unit configured to obtain, according to the at least one service declaration item, a service identifier corresponding to each of the at least one service declaration item; a recording unit configured to record, in a service information table of the first AP, service information corresponding to each of the at least one service declaration item, where the service information includes a BSSID, a device identifier, a service identifier, and a service declaration item; and a sending unit configured to return a service announcement response frame to the first STA, where the service announcement response frame includes the device identifier of the first STA and a service declaration acknowledgment item corresponding to each of the at least one service declaration item, and the service declaration acknowledgment item includes a service identifier and a service name.

In a first possible implementation manner of the seventh aspect, the first obtaining unit is configured to query an address correspondence table of the first AP according to the device address of the first STA, where the address correspondence table includes a correspondence between a device address and a device identifier; when a device address in one existing address correspondence in the address correspondence table of the first AP is the same as the device address of the first STA, obtain a device identifier in the existing address correspondence, that is, the device identifier of the first STA; or when a device address in any address correspondence in the address correspondence table of the first AP is different from the device address of the first STA, allocate the device identifier of the first STA from a device identifier pool, and record, in the address correspondence table, an address correspondence between the device address of the first STA and the device identifier of the first STA.

In a second possible implementation manner of the seventh aspect, the service announcement request frame further includes the device identifier of the first STA, and the first obtaining unit is configured to obtain the device identifier of the first STA from the service announcement request frame.

According to the seventh aspect or the first or second possible implementation manner of the seventh aspect, in a third possible implementation manner, the second obtaining unit is configured to query the service information table of the first AP according to a service name of a first service declaration item in the at least one service declaration item; when a service name in any piece of service information in the service information table of the first AP is different from the service name of the first service declaration item, allocate a first service identifier according to the service name of the first service declaration item; or when a service name in existing service information existing in the service information table of the first AP is the same as the service name of the first service declaration item, obtain a service identifier of the existing service information, that is, a first service identifier corresponding to the service name of the first service declaration item.

According to the third possible implementation manner of the seventh aspect, in a fourth possible implementation manner, the recording unit is configured to obtain first service information, where the first service information includes a BSSID of the first AP, the device identifier of the first STA, the first service identifier, and the first service declaration item, and record the first service information in the service information table of the first AP.

According to any one of the seventh aspect and above possible implementation manners of the seventh aspect, in a fifth possible implementation manner, the first AP further includes a maintenance unit, where the maintenance unit is configured to receive a second service maintenance frame from the first STA, where the second service maintenance frame includes a second maintenance state and at least one service maintenance item; update the service information table of the first AP according to the second service maintenance frame; and forward the second service maintenance frame to a second AP, so that the second AP updates a service information table of the second AP, where the service maintenance item includes the BSSID, the device identifier, and the service identifier.

According to the fifth possible implementation manner of the seventh aspect, in a sixth possible implementation manner, the maintenance unit is further configured to send a first service maintenance frame to the second AP, where the first service maintenance frame includes a first maintenance state and the service information corresponding to each of the at least one service declaration item, so that the second AP updates the service information table of the second AP, and the service information includes a BSSID, a device identifier, a service identifier, and a service declaration item.

According to the fifth or sixth possible implementation manner of the seventh aspect, in a seventh possible implementation manner, the maintenance unit is further configured to receive a third service maintenance frame, where the third service maintenance frame includes a first maintenance state and at least one piece of service information, or a second maintenance state and at least one service maintenance item, and update the service information table of the first AP according to the third service maintenance frame.

In an eighth aspect, a first STA for registering a service is provided and includes a sending unit configured to send a service announcement request frame to a first AP, where the service announcement request frame includes a device address of the first STA and at least one service declaration item, and each of at least one service declaration item includes a service name; and a receiving unit configured to receive a service announcement response frame from the first AP, where the service announcement response frame includes a device identifier of the first STA and a service declaration acknowledgment item corresponding to each of the at least one service declaration item, and the service declaration acknowledgment item includes a service identifier and a service name.

In a first possible implementation manner of the eighth aspect, the sending unit is further configured to send a second service maintenance frame to the first AP, where the second service maintenance frame includes a second maintenance state and at least one service maintenance item, and each of at least one service maintenance item includes a BSSID, the device identifier, and the service identifier.

In a ninth aspect, a method for managing a direct association service is provided and includes receiving, by a first AP, a direct association service request frame sent by a first STA, where the direct association service request frame includes a service request state and a service name; when the service request state is a first request state, obtaining a device address of a second STA; and probing a distance between the first STA and the second STA according to the device address of the second STA; when the distance between the first STA and the second STA is not greater than a direct distance, querying a direct association service management table of the first AP; and when one piece of existing direct association service management information does not exist in the direct association service management table of the first AP, where a service name in the existing direct association service management information is the same as the service name in the direct association service request frame, and a group address in the existing direct association service management information is the same as the device address of the second STA, recording first direct association service management information in the direct association service management table of the first AP, where the first direct association service management information includes the service name in the direct association service request frame and the device address of the second STA, and sending a direct association service response frame to the first STA, where the direct association service response frame includes the device address of the second STA.

In a first possible implementation manner of the ninth aspect, the method further includes, when one piece of existing direct association service management information exists in the direct association service management table of the first AP, where a service name in the existing direct association service management information is the same as the service name in the direct association service request frame, and a group address in the existing direct association service management information is the same as the device address of the second STA, sending, by the first AP, a direct association service response frame to the first STA, where the direct association service response frame includes the group address in the existing direct association service management information.

According to the ninth aspect or the first possible implementation manner of the ninth aspect, in a second possible implementation manner, the obtaining a device address of a second STA includes querying, by the first AP, a service information table of the first AP according to the service name in the direct association service request frame; when a service name in existing service information existing in the service information table of the first AP is the same as the service name in the direct association service request frame, and a device capability in the existing service information is supporting Wi-Fi Direct, obtaining, by the first AP, a device identifier of the existing service information, that is, a device identifier of the second STA; and obtaining, by the first AP, the device address of the second STA according to the device identifier of the second STA.

According to the ninth aspect or the first possible implementation manner of the ninth aspect, in a third possible implementation manner, the direct association service request frame further includes a device name; and correspondingly, the obtaining, by a first AP, a device address of a second STA includes obtaining, by the first AP, a device identifier in the direct association service request frame, that is, a device identifier of the second STA; and obtaining, by the first AP, the device address of the second STA according to the device identifier of the second STA.

According to any one of the ninth aspect and above possible implementation manners of the ninth aspect, in a fourth possible implementation manner, when the service request state is a second request state, the method further includes querying, by the first AP, the direct association service management table of the first AP according to the direct association service request frame; and when one piece of existing direct association service management information exists in the direct association service management table of the first AP, where a service name in the existing direct association service management information is the same as the service name in the direct association service request frame, and a group address in the existing direct association service management information is the same as a device address of the first STA, deleting the existing direct association service management information from the direct association service management table of the first AP.

In a tenth aspect, a method for obtaining a direct association service is provided and includes sending, by a first STA, a direct association service request frame to a first AP, where the direct association service request frame includes a service request state and a service name; when the service request state is a first request state, receiving, by the first STA, a direct association service response frame returned by the first AP, where the direct association service response frame includes a group address; and when it is determined according to the direct association service response frame that a direct association request succeeds, establishing, by the first STA, a direct association service to a second STA corresponding to the group address in the direct association service response frame.

In an eleventh aspect, a first AP for managing a direct association service is provided and includes a receiving unit configured to receive a direct association service request frame from a first STA, where the direct association service request frame includes a service request state and a service name; a first obtaining unit configured to, when the service request state is a first request state, obtain a device address of a second STA; a probe unit configured to probe a distance between the first STA and the second STA according to the device address of the second STA obtained by the first obtaining unit; a query unit configured to query a direct association service management table of the first AP; a second obtaining unit configured to obtain direct association service management information for a direct association service request of the first STA, where the direct association service management information includes a group address and a service name; and a sending unit configured to send a direct association service response frame to the first STA according to the direct association service management information obtained by the obtaining unit, so that the first STA establishes a direct association service to the second STA, where the direct association service response frame includes the group address.

In a first possible implementation manner of the eleventh aspect, the first obtaining unit is configured to query a service information table of the first AP according to the service name in the direct association service request frame; when a service name in existing service information existing in the service information table of the first AP is the same as the service name in the direct association service request frame, and a device capability in the existing service information is supporting Wi-Fi Direct, obtain a device identifier of the existing service information, that is, a device identifier of the second STA, and obtain the device address of the second STA according to the device identifier of the second STA; or, when the direct association service request frame includes a device name, obtain a device identifier in the direct association service request frame, that is, a device identifier of the second STA, and obtain the device address of the second STA according to the device identifier of the second STA.

According to the eleventh aspect or the first possible implementation manner of the eleventh aspect, in a second possible implementation manner, the query unit is configured to, when the service request state is the first request state, and the distance that is between the first STA and the second STA and is probed by the probe unit is not greater than a direct distance, query the direct association service management table of the first AP according to the service name in the direct association service request frame and the device address of the second STA.

According to the eleventh aspect or the first or second possible implementation manner of the eleventh aspect, in a third possible implementation manner, the second obtaining unit is configured to, when one piece of existing direct association service management information exists in the direct association service management table of the first AP, where a service name in the existing direct association service management information is the same as the service name in the direct association service request frame, and a group address in the existing direct association service management information is the same as the device address of the second STA, obtain the existing direct association service management information; or when a service name and a group address in any piece of direct association service management information in the direct association service management table of the first AP are different from the service name in the direct association service request frame and the device address of the second STA, obtain first direct association service management information, and record the first direct association service management information in the direct association service management table of the first AP, where the first direct association service management information includes the service name in the direct association service request frame and the device address of the second STA.

According to any one of the eleventh aspect and above possible implementation manners of the eleventh aspect, in a fourth possible implementation manner, the first AP further includes a direct association management unit; the query unit is further configured to, when the service request state is a second request state, query the direct association service management table of the first AP according to the service name in the direct association service request frame and a device address of the first STA; and the direct association management unit is configured to, when the service request state in the direct association service request frame is the second request state, and one piece of existing direct association service management information exists in the direct association service management table of the first AP, where a service name in the existing direct association service management information is the same as the service name in the direct association service request frame, and a group address in the existing direct association service management information is the same as the device address of the first STA, delete the existing direct association service management information from the direct association service management table of the first AP.

In a twelfth aspect, a STA for obtaining a direct association service is provided and includes a sending unit configured to send a direct association service request frame to a first AP, where the direct association service request frame includes a service request state and a service name; a receiving unit configured to receive a direct association service response frame returned by the first AP, where the direct association service response frame includes a group address; and a service establishing unit configured to, when it is determined according to the direct association service response frame that a direct association request succeeds, establish a direct association service to a second STA corresponding to the group address in the direct association service response frame.

In a thirteenth aspect, a system for discovering a service is provided and includes the foregoing first AP for discovering a service and the foregoing first STA for discovering a service.

In a fourteenth aspect, a system for registering a service is provided and includes the foregoing first AP for registering a service and the foregoing first STA for registering a service.

In a fifteenth aspect, a system for managing a direct association service is provided and includes the foregoing first AP for managing a direct association service and the foregoing first STA for obtaining a direct association service.

Using the foregoing solutions, a first AP may serve as a proxy for a first STA to search for service information in a network, and the first AP may provide wider and richer service information to a user through a local search and a remote search, thereby meeting a user's demand of selecting a network according to a service requirement. An AP may serve as a proxy to discover a STA that provides a direct association service and manage direct communication between STAs, so that a STA that provides a service in the network also does not need to periodically listen to a search request of another device and on a channel, thereby reducing resource consumption and power consumption of a STA that provides a service. In addition, the first STA can obtain service information using the first AP both before association and after association, thereby avoiding a problem of frequent association and disassociation between different APs, which occurs because after being associated with an AP, the first STA discovers that a required service does not exist, and is then disassociated. This ensures that a user can more rapidly and accurately access a network that provides a service, and improves user experience. Moreover, the first STA associated with the first AP may declare or cancel service information on the first AP, the first STA does not need to periodically listen to a search request of another device and on a channel, and the first AP may further spread, to an accessible adjacent AP in the network, device information and service information that are declared on the first AP, and may also receive service information provided by an accessible adjacent AP, to provide richer service information to a user. Finally, because service information maintained on an AP is released by a STA that is authenticated and associated with the AP, security is ensured and reliability of a service is further ensured.

BRIEF DESCRIPTION OF DRAWINGS

FIG. 23 is a schematic diagram of a service information table according to an embodiment of the present invention;

FIG. 24 is a schematic diagram of simplified service information according to an embodiment of the present invention;

FIG. 25 is a schematic diagram of a service discovery response frame according to an embodiment of the present invention;

FIG. 26 is a schematic diagram of a service information element according to an embodiment of the present invention;

FIG. 27 is a schematic diagram of a service announcement request frame according to an embodiment of the present invention;

DESCRIPTION OF EMBODIMENTS

The following clearly describes the technical solutions in the embodiments of the present invention with reference to the accompanying drawings in the embodiments of the present invention. The described embodiments are merely some rather than all of the embodiments of the present invention. All other embodiments obtained by a person of ordinary skill in the art based on the embodiments of the present invention without creative efforts shall fall within the protection scope of the present invention.

It should be noted that, in the embodiments of the present invention, a service announcement request frame, a service announcement response frame, a service maintenance frame, a service discovery request frame, a service discovery response frame, a direct association request frame, and a direct association response frame may be implemented by extending a Public Action frame with a category being 4 in an action frame in an existing WLAN network; may also be implemented using existing management frames such as a Public Action frame, a Generic Advertisement Service (GAS) initial request frame, a GAS initial response frame, a GAS comeback request frame, and a GAS comeback response frame used in the IEEE 802.11u; may also be implemented by extending the Access Network Query Protocol (ANQP) in the IEEE 802.11u and using extended elements to carry new service-related information; and definitely may also be implemented by defining new frames, as long as objectives of the present invention can be achieved. The implementation is not limited in the present invention.

Figures 19, 20, 21:
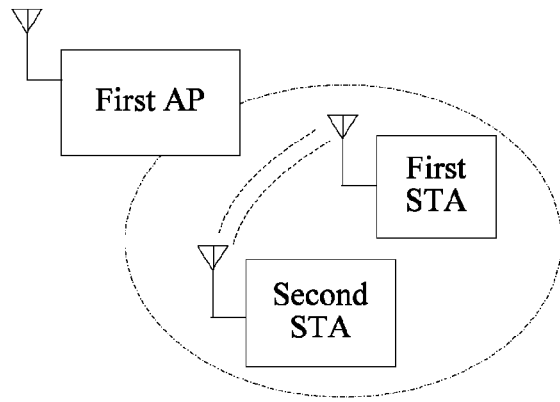
FIG. 19 is a schematic structural diagram of a system for managing a direct association service according to an embodiment of the present invention.
FIG. 20 is a schematic diagram of a Public Action frame according to an embodiment of the present invention.
FIG. 21 is a schematic diagram of a query type table according to an embodiment of the present invention.

In the embodiments of the present invention, extension of a Public Action frame is used as an example to describe the technical solutions of the present invention. FIG. 20 is a schematic structural diagram of a Public Action frame, where a value of a category is 4, a "Public Action field value" field is used for identifying a specific Public Action frame type, and currently there are 16 types of Public Action frames, which are Public Action field values 0 to 15. In the embodiments of the present invention, an existing Public Action frame is extended. For example, a service discovery request frame is identified by a Public Action field value being 16, a service discovery response frame is identified by a Public Action field value being 17, a service announcement request frame is identified by a Public Action field value being 18, a service announcement acknowledgment frame is identified by a Public Action field value being 19, a service maintenance frame is identified by a Public Action field value being 20, a direct association request frame is identified by a Public Action field value being 21, and a direct association response frame is identified by a Public Action field value being 22.

It should be noted that, in the embodiments of the present invention, the Public Action field values used in extended Public Action frames are only exemplary, and with development of standards, different values may be used. The values are not limited in the present invention.

It should be noted that, a service identifier, a device identifier, and a group identifier that are involved in the embodiments of the present invention may be allocated based on a local rule of an AP, that is, locally unique for the AP; or may be allocated based on a rule of being globally uniform, that is, globally unique. The allocation is not limited in the embodiments of the present invention.

It should be noted that, in specific implementation, it may be configured that only local service information, that is, service information in a BSS to which an AP belongs, is saved on the AP; it may also be configured that both local service information and remote service information, that is, service information in a BSS to which an accessible adjacent AP of an AP belongs, are saved on the AP. The configuration is not limited in the embodiments of the present invention.

It should be noted that, in specific implementation, in the embodiments of the present invention, a service information table of an AP may be one table, or may be divided into two sub-tables, for example, a local service information table and a remote service information table, which is not limited in the present invention. Service information registered on the AP is saved in the local service information table, and service information registered on an accessible adjacent AP of the AP is saved in the remote service information table. A person skilled in the art may understand that querying the local service information table may be considered as querying all service information whose BSSID is the same as a MAC address of the AP, and querying the remote service information table may be considered as querying all service information whose BSSID is different from the MAC address of the AP; if both the local service information table and the remote service information table are to be queried, a BSSID is not limited.

Figure 1:
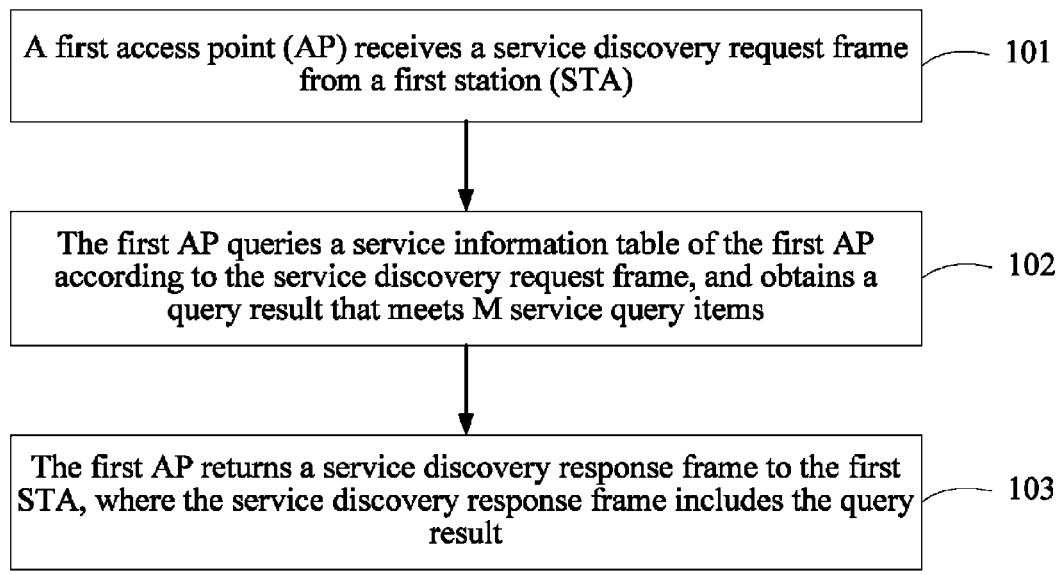
FIG. 1 is a flowchart of a method for discovering a service according to an embodiment of the present invention.

FIG. 1 is a flowchart of a method for discovering a service according to an embodiment of the present invention. In this embodiment, the method for discovering a service is implemented by a first AP. As shown in FIG. 1, the method includes the following steps:

101. The first AP receives a service discovery request frame from a first STA, where the service discovery request frame includes M service query items, and each service query item includes a query type and query content.

M is an integer greater than or equal to 0.

It should be noted that in this embodiment of the present invention, a STA needs to query a required service during a service discovery process, where the query type may be a query type name such as a BSSID, a device name, a device capability, a service name, and a service identifier, or may be a query type identifier; for example, one query type identifier is defined for each query type name, and usually the query type identifier is globally uniform, which is not limited in the present invention, as long as the technical solutions of the present invention can be implemented. Exemplarily, in a query type information table shown in FIG. 21, one query type identifier is defined for each query type name, which is not limited in the present invention.

Figure 22:
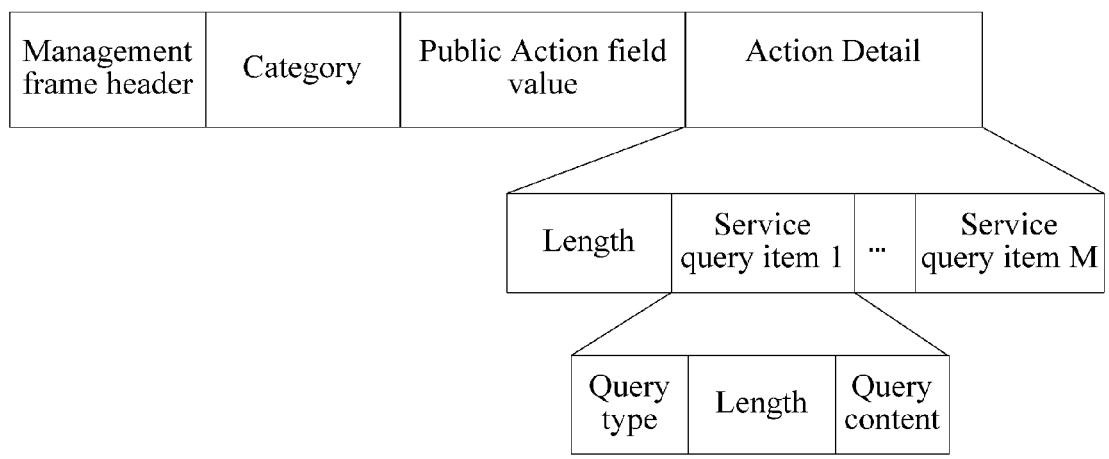
FIG. 22 is a schematic diagram of a service discovery request frame according to an embodiment of the present invention.

Exemplarily, the service discovery request frame may be shown in FIG. 22, where Length after a "Public Action field value" field is variable and is used to represent a length of an action detail in the service discovery request frame, and Length in each service query item is variable and is used to represent a length of the query content.

102. The first AP queries a service information table of the first AP according to the service discovery request frame, and obtains a query result that meets the M service query items.

The obtaining a query result that meets the M service query items includes obtaining the query result that meets the M service query items and is in the service information table of the first AP.

For example, when M is 1, that is, a service discovery request frame includes one service query item, for example, a query type is "service name" and query content is "printing", a query result needs to meet that "service name" is "printing". When M is 2, that is, a service discovery request frame includes two service query items, for example, the first service query item includes a query type being "service name" and query content being "printing", and the second service query item includes a query type being "device capability" and query content being "supporting Wi-Fi Direct", a query result needs to meet that "service name" is "printing" and "device capability" is "supporting Wi-Fi Direct".

When M is 0, the query result is all service information in the service information table of the first AP.

The service information includes a BSSID, a device identifier, a service identifier, and a service name; the service information may further include a network access policy, a device name, a device capability, service description, and the like.

Exemplarily, the service information table may be shown in FIG. 23, where the BSSID is a MAC address of an AP associated with a STA that declares the service information, for example, a MAC address of the first AP in this embodiment.

When M is greater than or equal to 1, the query result may be all service information that meets the M service query items, or may be simplified service information that meets the M service query items.

For example, when M is 2, that is, a service discovery request frame includes two service query items, for example, the first service query item includes a query type being "service name" and query content being "printing", and the second service query item includes a query type being "device capability" and query content being "supporting Wi-Fi Direct", all service information that meets that "service name" is "printing" and "device capability" is "supporting Wi-Fi Direct" can be returned, or all simplified service information that meets that "service name" is "printing" and "device capability" is "supporting Wi-Fi Direct" can be returned, which is not limited in the present invention. As shown in FIG. 24, compared with service information, in simplified service information, query types being "service name" and "device capability" in a service query item are removed; returning of simplified service information can reduce an amount of information to be transmitted, thereby improving transmission efficiency.

It should be noted that, in this embodiment of the present invention, returning of service information is used as an example to describe a technical solution of the present invention, but does not constitute any limitation to the present invention.

103. The first AP returns a service discovery response frame to the first STA, where the service discovery response frame includes the query result.

Exemplarily, the service discovery response frame may be shown in FIG. 25, where Length is variable and is used to represent a length of an action detail in a service announcement response frame.

Definitely, the query result in the service discovery response frame may also be empty, which represents that the first AP does not discover service information that meets the M service query items. In the service discovery response frame shown in FIG. 25, a value of the Length field is 0.

Further, for the service discovery request frame of the first STA, the first AP may search the service information table of the first AP, and may further search that of another accessible adjacent AP, which can be configured as required.

It should be noted that, the first AP may forward a service discovery request frame to another accessible adjacent AP in a wireless manner, and receive a service discovery response frame returned by the another accessible adjacent AP. The first AP may also forward a service discovery request frame of the first STA to another accessible adjacent AP in another manner, and receive a service discovery response frame returned by the another accessible adjacent AP. For example, when an access controller (AC) exists in a WLAN, the first AP may bind and encapsulate a service discovery request frame and a service discovery response frame using a data message in the Control And Provisioning of Wireless Access Points (CAPWAP) protocol, and communicate with another accessible adjacent AP using the AC. For another example, when no AC exists in a WLAN and an AP is directly connected to an Ethernet, the first AP may communicate with another accessible adjacent AP using the Transmission Control Protocol/Internet Protocol (TCP/IP), and encapsulate a service discovery request frame and a service discovery response frame using the TCP/IP protocol. A manner in which the first AP and another accessible adjacent AP communicate with each other is not limited in the present invention. For ease of description, forwarding is generally used to describe communication between the first AP and another accessible adjacent AP in the following.

Figure 2:
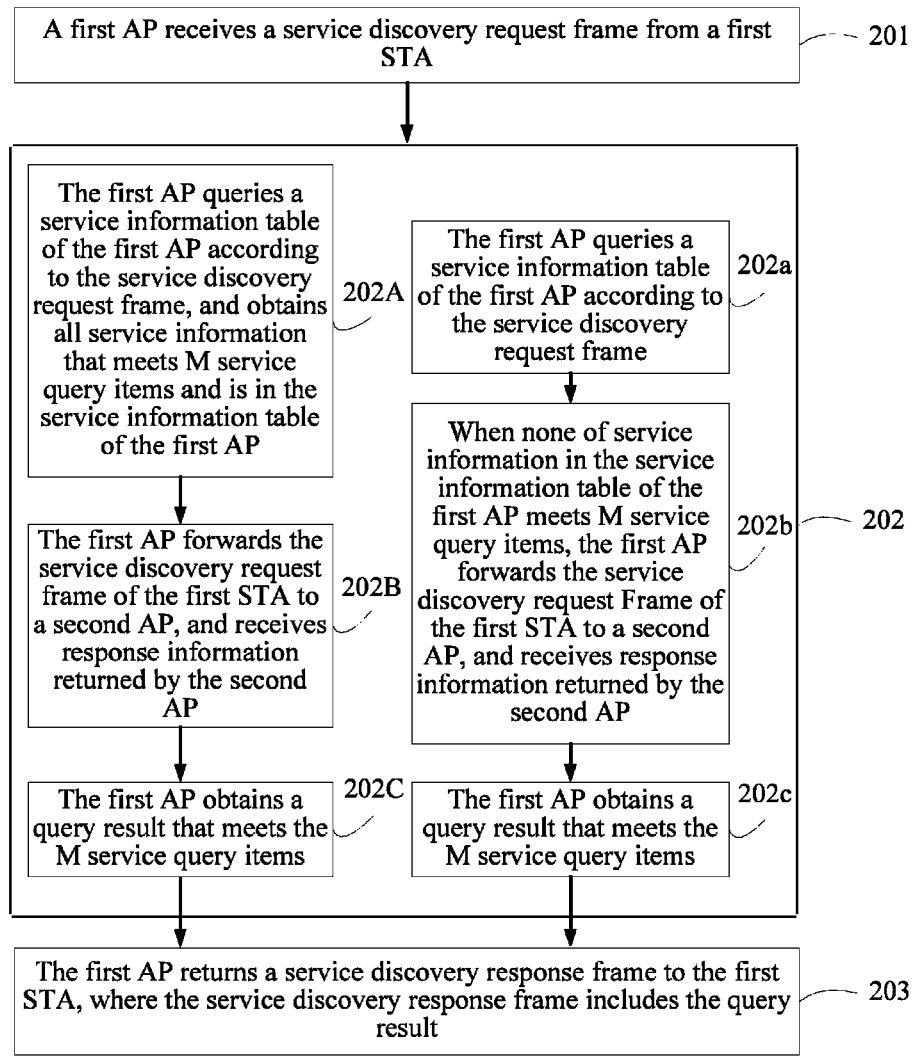
FIG. 2 is a flowchart of another method for discovering a service according to an embodiment of the present invention.

FIG. 2 is a flowchart of another method for discovering a service according to an embodiment of the present invention. In this embodiment, the technical solution of the present invention is further described on the basis of the method for discovering a service shown in FIG. 1 of the present invention. As shown in FIG. 2, the method includes the following steps:

201. A first AP receives a service discovery request frame from a first STA, where the service discovery request frame includes M service query items, and each service query item includes a query type identifier and query content.

M is an integer greater than or equal to 0.

Refer to 101 for details, which are not described herein again.

202. The first AP queries a service information table of the first AP according to the service discovery request frame, and obtains a query result that meets the M service query items.

If the first AP is configured with a forwarding function, that is, the first AP may serve as a proxy for a STA to discover service information on an accessible adjacent AP of the first AP, step 202 includes 202A to 202C, or 202a to 202c.

202A. The first AP queries the service information table of the first AP according to the service discovery request frame, and obtains all service information that meets the M service query items and is in the service information table of the first AP.

Refer to step 102 for details, which are not described herein again.

202B. The first AP forwards the service discovery request frame to a second AP, receives a service discovery response frame returned by the second AP, where the service discovery response frame returned by the second AP includes all service information that meets the M service query items and is in a service information table of the second AP, and obtains the service information included in the service discovery response frame returned by the second AP.

For a processing process after the second AP receives the service discovery request frame, refer to step 102 in the method shown in FIG. 1 of the present invention.

202C. The first AP obtains the query result that meets the M service query items, where the query result includes all the service information that meets the M service query items and is in the service information table of the first AP and the service information included in the service discovery response frame returned by the second AP.

A person skilled in the art may understand that, step 202B may be performed before or after step 202A, and steps 202B and 202A may also be performed synchronously.

Through steps 202A to 202C, regardless of whether service information that meets the M service query items can be found on the first AP, the first AP forwards the service discovery request frame of the first STA to another accessible adjacent AP to perform a service search in a wider range.

202a. The first AP queries the service information table of the first AP according to the service discovery request frame.

202b. When none of service information in the service information table of the first AP meets the M service query items, the first AP forwards the service discovery request frame to a second AP, and receives a service discovery response frame returned by the second AP, where the service discovery response frame returned by the second AP includes all service information that meets the M service query items and is in a service information table of the second AP; and the first AP obtains the service information included in the service discovery response frame returned by the second AP.

For a processing process after the second AP receives the service discovery request frame, refer to step 102 in the method shown in FIG. 1 of the present invention.

Optionally, the first AP may record, in the service information table of the first AP, all the service information that is included in the service discovery response frame returned by the second AP, meets the M service query items, and is on the second AP.

202c. Otherwise, when at least one piece of service information existing in the service information table of the first AP meets the M service query items, obtain all the service information that meets the M service query items and is in the service information table of the first AP.

Through steps 202a to 202c, the first AP forwards the service discovery request frame of the first STA to another accessible adjacent AP only when service information that meets the M service query items is not found on the first AP, to perform a service search in wider range.

Optionally, when the first AP forwards the service discovery request frame of the first STA to the second AP, the service discovery request may further carry a device address or a device identifier of the first STA, so that the second AP determines whether the service discovery request frame of the first STA has been processed.

It should be noted that an example in which the first AP forwards the service discovery request frame of the first STA to the second AP is used herein to describe the technical solution of the present invention. In specific implementation, there may be multiple accessible adjacent APs of the first AP, and the processes are same and are not described herein again.

203. The first AP returns the service discovery response frame to the first STA, where the service discovery response frame includes the query result.

Refer to step 103 for details, which are not described herein again.

Using the technical solution provided in this embodiment of the present invention, regardless of whether the first AP only saves local service information or saves both local service information and remote service information, the first AP can discover service information within an accessible range. Therefore, a service discovery and search function in a wider range can be provided, richer service information can be provided to a user, and a user's demand of selecting a network according to a service requirement is met.

Usually, before a STA is associated, when no AP information is available, the STA needs to obtain information about an available AP through scanning and is then associated with the available AP. A STA may obtain an available AP in a manner of active scanning or passive scanning. In the technical solution of the present invention, after information about an available AP is obtained through scanning, service information on the available AP may be obtained using a service discovery request frame and a service discovery response frame. An existing scanning manner may also be extended. While information about an available AP is obtained, service directory information on the available AP is obtained; new frames may be defined for active scanning and passive scanning, respectively, or a probe request frame, a probe response frame, and a beacon frame may also be extended, for example, a new information element is defined to describe service information, which is not limited in the present invention.

In this embodiment of the present invention, the technical solution of the present invention is described using an example in which a new service information element is defined, a probe request frame, a probe response frame, and a beacon are extended, and while information about an available AP is obtained, service directory information on the available AP is also obtained. A service information element is distinguished using an element identifier (element ID). Currently, in the IEEE 802.11 standard, 17-31, 128-129, and 133-136 are still reserved for use for the element ID, and one value may be selected from 17-31, 128-129, and 133-136 to serve as an element ID of an extended service information element in the technical solution of the present invention.

Figure 3:
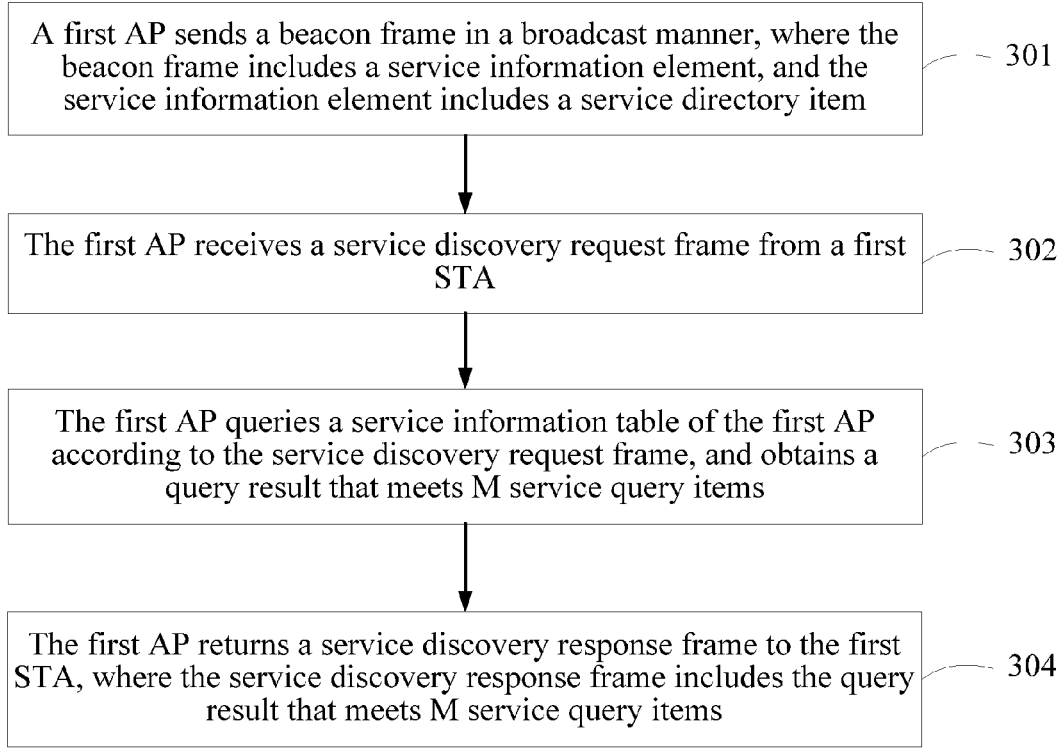
FIG. 3 is a flowchart of still another method for discovering a service according to an embodiment of the present invention.

FIG. 3 is a flowchart of still another method for discovering a service according to an embodiment of the present invention. In this embodiment, the technical solution of the present invention is further described on the basis of the method for discovering a service shown in FIG. 1 or FIG. 2. As shown in FIG. 3, the method includes the following steps:

301. A first AP sends a beacon frame in a broadcast manner, where the beacon frame includes a service information element.

When a passive scanning manner is adopted, the first AP periodically broadcasts a beacon frame, and a first STA needs to perform listening channel by channel to capture a beacon frame sent by the first AP, and obtains information about the first AP and service directory information on the first AP.

The service information element includes a service directory item, and the service directory item includes a BSSID, a service identifier, and a service name.

Optionally, the service information element may further include a network type; the service directory item may further include service description. The network type may follow a definition in the IEEE 802.11 standard, for example, a private network.

Exemplarily, the service information element may be shown in FIG. 26, where Length has a value of 0 to 256 bytes and is used to represent a length of the service information element.

302. The first AP receives a service discovery request frame from a first STA, where the service discovery request frame includes M service query items, and each service query item includes a query type identifier and query content.

M is an integer greater than or equal to 0.

Refer to step 101 for details, which are not described herein again.

303. The first AP queries a service information table of the first AP according to the service discovery request frame, and obtains a query result that meets the M service query items.

Refer to step 102 or 202 for details, which are not described herein again.

304. The first AP returns a service discovery response frame to the first STA, where the service discovery response frame includes the query result that meets the M service query items.

Refer to step 103 for details, which are not described herein again.

Figure 4:
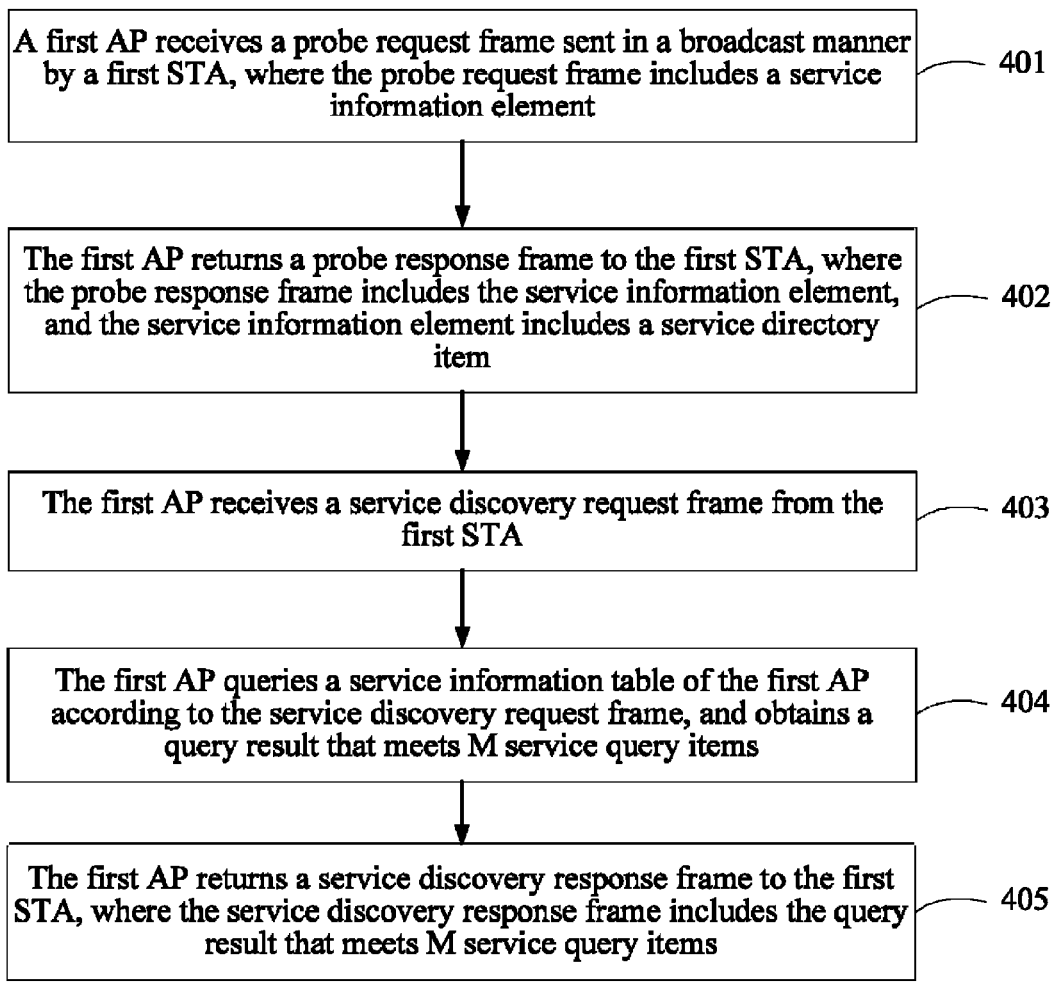
FIG. 4 is a flowchart of yet another method for discovering a service according to an embodiment of the present invention.

FIG. 4 is a flowchart of yet another method for discovering a service according to an embodiment of the present invention. In this embodiment, the technical solution of the present invention is further described on the basis of the method for discovering a service shown in FIG. 1 or FIG. 2. As shown in FIG. 4, the method includes the following steps:

401. A first AP receives a probe request frame sent in a broadcast manner by a first STA, where the probe request frame includes a service information element.

A Length field in the service information element is 0.

When an active scanning manner is adopted, the first STA sends, on each channel, a probe request frame carrying a service element, actively scans for an available AP on the channel, and requests service directory information on the available AP.

402. The first AP returns a probe response frame to the first STA, where the probe response frame includes the service information element.

The service information element includes a service directory item, and the service directory item includes a BSSID, a service identifier, and a service name.

After receiving the probe request frame of the first STA, the first AP returns the probe response frame to the first STA and provides information about the first AP to the first STA. Moreover, because the probe request frame includes the service information element, the probe response frame returned by the first AP to the first STA also includes the service information element, and service directory information on the first AP is provided to the first STA.

Optionally, the service information element may further include a network type; the service directory item may further include service description. The network type may follow a definition in the IEEE 802.11 standard, for example, a private network.

Exemplarily, the service information element may be shown in FIG. 26, where Length has a value of 0 to 256 bytes and is used to represent a length of the service information element.

403. The first AP receives a service discovery request frame from the first STA, where the service discovery request frame includes M service query items, and each service query item includes a query type identifier and query content.

M is an integer greater than or equal to 0.

Refer to step 101 for details, which are not described herein again.

404. The first AP queries a service information table of the first AP according to the service discovery request frame, and obtains a query result that meets the M service query items.

Refer to step 102 or 202 for details, which are not described herein again.

405. The first AP returns a service discovery response frame to the first STA, where the service discovery response frame includes the query result that meets the M service query items.

Refer to step 103 for details, which are not described herein again.

By adopting the technical solution provided in this embodiment of the present invention, when a first STA needs to obtain service information, regardless of whether it is before or after the first STA is associated, a first AP may discover a service, thereby avoiding a problem of frequent association and disassociation between different APs, which occurs because after being associated with an AP, the first STA discovers that a required service does not exist, and is then disassociated. This ensures that a user can more rapidly and accurately access a network that provides a service, and improves user experience. Moreover, a STA that provides a service in a network also does not need to periodically listen to a search request of another device and on a channel, thereby reducing resource consumption and power consumption of a STA that provides a service.

Figure 5A:
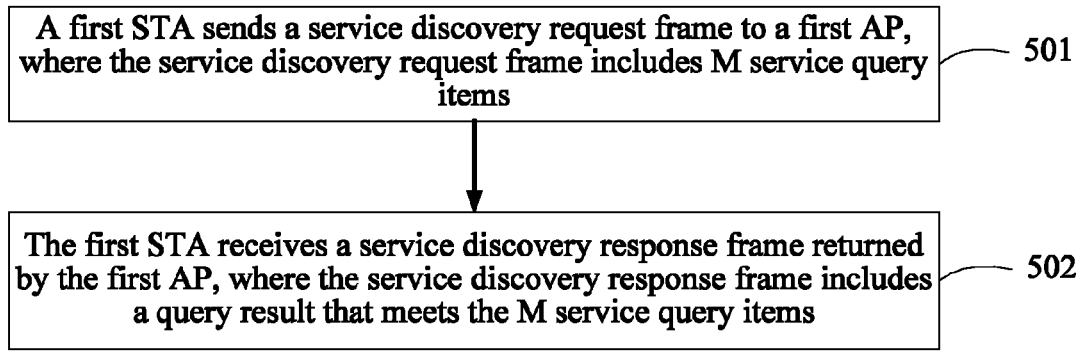
FIG. 5A and FIG. 5B are flowcharts of still yet another method for discovering a service according to an embodiment of the present invention.

FIG. 5A is a flowchart of still yet another method for discovering a service according to an embodiment of the present invention. In this embodiment, the method for discovering a service is implemented by a first STA. As shown in FIG. 5A, the method includes the following steps:

501. The first STA sends a service discovery request frame to a first AP, where the service discovery request frame includes M service query items, and each service query item includes a query type and query content.

M is an integer greater than or equal to 0.

It should be noted that in this embodiment of the present invention, a STA needs to query a required service during a service discovery process, where the query type may be a query type name such as a BSSID, a device name, a device capability, a service name, and a service identifier, or may be a query type identifier; for example, one query type identifier is defined for each query type name, and usually the query type identifier is globally uniform, which is not limited in the present invention, as long as the technical solutions of the present invention can be implemented. Exemplarily, in a query type information table shown in FIG. 21, one query type identifier is defined for each query type name, which is not limited in the present invention.

Exemplarily, the service discovery request frame may be shown in FIG. 22, where Length after a Public Action field value field is variable and is used to represent a length of an action detail in the service discovery request frame, and Length in each service query item is variable and is used to represent a length of the query content.

502. The first STA receives a service discovery response frame returned by the first AP, where the service discovery response frame includes a query result that meets the M service query items.

The query result may be service information that meets the M service query items, or may be simplified service information that meets the M service query items.

The service information includes a BSSID, a device identifier, a service identifier, and a service name; the service information may further include a network access policy, a device name, a device capability, service description, and the like.

Exemplarily, the service information table may be shown in FIG. 23, where the BSSID is a MAC address of an AP associated with a STA that declares the service information, for example, a MAC address of the first AP in this embodiment.

For example, when M is 2, that is, a service discovery request frame includes two service query items, for example, the first service query item includes a query type being "service name" and query content being "printing", and the second service query item includes a query type being "device capability" and query content being "Wi-Fi Direct", a query result is all service information that meets that "service name" is "printing" and "device capability" is "Wi-Fi Direct", or may be all simplified service information that meets that "service name" is "printing" and "device capability" is "Wi-Fi Direct". The query result is not limited in the present invention. As shown in FIG. 24, compared with service information, in simplified service information, query types being "service name" and "device capability" in a service query item are removed; returning of simplified service information can reduce an amount of information to be transmitted, thereby improving transmission efficiency.

It should be noted that, in this embodiment of the present invention, an example in which the query result is service information is used to describe the technical solution of the present invention, but does not constitute any limitation to the present invention.

Exemplarily, the service discovery response frame may be shown in FIG. 25, where Length is variable and is used to represent a length of an action detail in a service announcement response frame.

Definitely, the query result in the service discovery response frame may also be empty, which represents that the first AP does not discover service information that meets the M service query items. In the service discovery response frame shown in FIG. 25, a value of the Length field is 0.

Optionally, after the first STA sends the service discovery request frame, a timer may also be set. If a service discovery response frame returned by the first AP is not received within a set time of the timer, the first STA considers that current service discovery fails; the first STA may send a service discovery request frame to the first AP again, or may send a service discovery request frame to another AP.

Figure 5B:
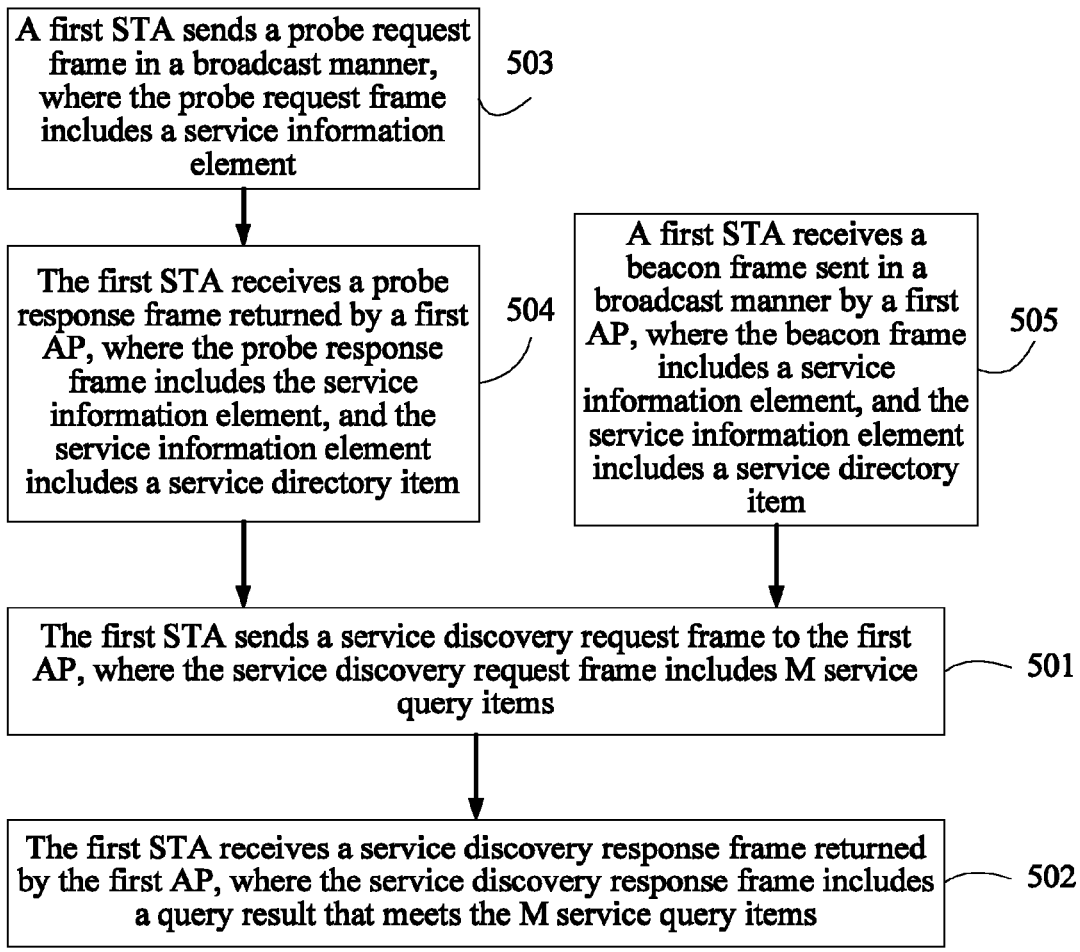

Optionally, as shown in FIG. 5B, before step 501, the first STA needs to obtain information about an available AP through scanning, and requests service directory information on the available AP.

When an active scanning manner is adopted, the method further includes the following steps:

503. The first STA sends a probe request frame in a broadcast manner, where the probe request frame includes a service information element.

A Length field in the service information element is 0. The probe request frame is used to request service directory information on an AP; therefore, a service directory item in the service information element of the probe request frame is empty, and the Length field in the service information element is 0.

504. The first STA receives a probe response frame returned by the first AP, where the probe response frame includes the service information element, the service information element includes a service directory item, and the service directory item includes a BSSID, a service identifier, and a service name.

When a passive scanning manner is adopted, the method further includes the following steps:

505. The first STA receives a beacon frame sent in a broadcast manner by the first AP, where the beacon frame includes a service information element, the service information element includes a service directory item, and the service directory item includes a BSSID, a service identifier, and a service name.

When a passive scanning manner is adopted, the first AP periodically broadcasts a beacon frame, and the first STA needs to perform listening channel by channel to capture a beacon frame sent by the first AP, and obtains information about the first AP and service directory information on the first AP.

By adopting the technical solution provided in this embodiment of the present invention, regardless of whether it is before or after a first STA is associated, a first AP may serve as a proxy for the first STA to search for device information and service information that can be provided in a network, thereby obtaining richer service information, meeting a user's demand of selecting a network according to a service requirement, and avoiding a problem of frequent association and disassociation between different APs, which occurs because after being associated with an AP, the first STA discovers that a required service does not exist, and is then disassociated. This ensures that a user can more rapidly and accurately access a network that provides a service, and improves user experience.

An embodiment of the present invention provides a system for discovering a service. The system includes a first AP shown in FIG. 6A and a first STA shown in FIG. 7A. The first STA and the first AP interact with each other to implement the methods for discovering a service provided in the embodiments of the present invention.

The system may further include a second AP, and the second AP is an accessible adjacent AP of the first AP. It may be understood that multiple second APs may exist in the system.

The following describes in detail the first STA and the first AP in the system for discovering a service provided in the embodiment of the present invention.

Figure 6A:
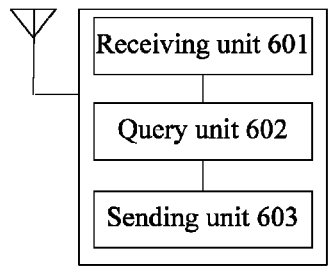
FIG. 6A and FIG. 6B are schematic structural diagrams of an AP for discovering a service according to an embodiment of the present invention.

FIG. 6A is a schematic structural diagram of a first AP for discovering a service according to an embodiment of the present invention. As shown in FIG. 6A, the first AP includes a receiving unit 601, a query unit 602, and a sending unit 603.

The receiving unit 601 is configured to receive a service discovery request frame from a first STA, where the service discovery request frame includes M service query items.

Each service query item includes a query type and query content, and M is an integer greater than or equal to 0.

It should be noted that in this embodiment of the present invention, a STA needs to query a required service during a service discovery process, where the query type may be a query type name such as a BSSID, a device name, a device capability, a service name, and a service identifier, or may be a query type identifier; for example, one query type identifier is defined for each query type name, and usually the query type identifier is globally uniform, which is not limited in the present invention, as long as the technical solutions of the present invention can be implemented. Exemplarily, in a query type information table shown in FIG. 21, one query type identifier is defined for each query type name, which is not limited in the present invention.

Exemplarily, the service discovery request frame may be shown in FIG. 22, where Length after a Public Action field value field is variable and is used to represent a length of an action detail in the service discovery request frame, and Length in each service query item is variable and is used to represent a length of the query content.

The query unit 602 is configured to query a service information table of the first AP according to the service discovery request frame, and obtain a query result that meets the M service query items.

The query unit 602 is configured to obtain the query result that meets the M service query items and is in the service information table of the first AP.

For example, when M is 1, that is, a service discovery request frame includes one service query item, for example, a query type is "service name" and query content is "printing", a query result needs to meet that "service name" is "printing". When M is 2, that is, a service discovery request frame includes two service query items, for example, the first service query item includes a query type being "service name" and query content being "printing", and the second service query item includes a query type being "device capability" and query content being "supporting Wi-Fi Direct", a query result needs to meet that "service name" is "printing" and "device capability" is "supporting Wi-Fi Direct".

When M is 0, the query result is all service information in the service information table of the first AP.

The service information includes a BSSID, a device identifier, a service identifier, and a service name; the service information may further include a network access policy, a device name, a device capability, service description, and the like.

Exemplarily, the service information table may be shown in FIG. 23, where the BSSID is a MAC address of an AP associated with a STA that declares the service information, for example, a MAC address of the first AP in this embodiment When M is greater than or equal to 1, the query result may be all service information that meets the M service query items, or may be simplified service information that meets the M service query items.

For example, when M is 2, that is, a service discovery request frame includes two service query items, for example, the first service query item includes a query type being "service name" and query content being "printing", and the second service query item includes a query type being "device capability" and query content being "supporting Wi-Fi Direct", all service information that meets that "service name" is "printing" and "device capability" is "supporting Wi-Fi Direct" can be returned, or all simplified service information that meets that "service name" is "printing" and "device capability" is "supporting Wi-Fi Direct" can be returned, which is not limited in the present invention. As shown in FIG. 24, compared with service information, in simplified service information, query types being "service name" and "device capability" in a service query item are removed; returning of simplified service information can reduce an amount of information to be transmitted, thereby improving transmission efficiency.

It should be noted that, in this embodiment of the present invention, returning of service information is used as an example to describe the technical solution of the present invention, but does not constitute any limitation to the present invention.

The sending unit 603 is configured to return a service discovery response frame to the first STA, where the service discovery response frame includes the query result.

Exemplarily, the service discovery response frame may be shown in FIG. 25, where Length is variable and is used to represent a length of an action detail in a service announcement response frame.

Definitely, the query result in the service discovery response frame may also be empty, which represents that the first AP does not discover service information that meets the M service query items. In the service discovery response frame shown in FIG. 25, a value of the Length field is 0.

Figure 6B:
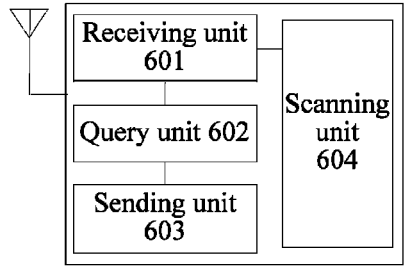

Optionally, as shown in FIG. 6B, the first AP further includes a scanning unit 604, where the scanning unit 604 is configured to send a beacon frame in a broadcast manner; or the scanning unit 604 is configured to receive a probe request frame sent in a broadcast manner by the first STA, and return a probe response frame to the first STA.

When a passive scanning manner is adopted, the scanning unit 604 is configured to periodically broadcast a beacon frame, where the beacon frame includes a service information element, the service information element includes a service directory item, and the service directory item includes a BSSID, a service identifier, and a service name. The first STA needs to perform listening channel by channel to capture a beacon frame sent by the first AP and obtain information about the first AP and service directory information on the first AP.

When an active scanning manner is adopted, the first STA sends, on each channel, a probe request frame carrying a service information element, actively scans an available AP on the channel, and requests service directory information on the available AP. The scanning unit 604 is configured to receive the probe request frame sent in a broadcast manner by the first STA, where the probe request frame includes the service information element, and a Length field in the service information element is 0; and return a probe response frame to the first STA, where the probe response frame includes the service information element, the service information element includes a service directory item, and the service directory item includes a BSSID, a service identifier, and a service name, which are used to provide information about the first AP and service directory information on the first AP to the first STA.

Exemplarily, the service information element may be shown in FIG. 26, where Length has a value of 0 to 256 bytes and is used to represent a length of the service information element.

Optionally, the service information element may further include a network type; the service directory item may further include service description. The network type may follow a definition in the IEEE 802.11 standards, for example, a private network.

Figure 6C:
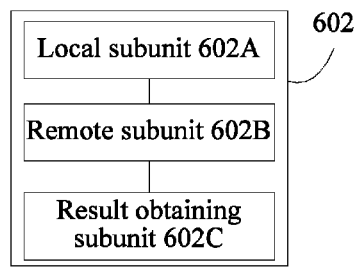
FIG. 6C and FIG. 6D are schematic structural diagrams of a query unit in the AP for discovering a service according to an embodiment of the present invention.

Optionally, as shown in FIG. 6C, the query unit 602 includes a local subunit 602A configured to query the service information table of the first AP according to the service discovery request frame, and obtain all service information that meets the M service query items and is in the service information table of the first AP; a remote subunit 602B configured to forward the service discovery request frame to a second AP, receive a service discovery response frame returned by the second AP, where the service discovery response frame returned by the second AP includes all service information that meets the M service query items and is in a service information table of the second AP, and obtain the service information included in the service discovery response frame returned by the second AP; and a result obtaining subunit 602C configured to obtain the query result that meets the M service query items, where the query result includes the service information obtained by the local subunit 602A and the service information obtained by the remote subunit 602B.

Figure 6D:
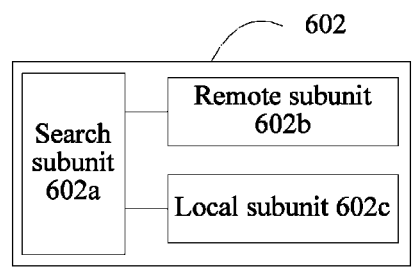

Optionally, as shown in FIG. 6D, the query unit 602 includes a search subunit 602a configured to query the service information table of the first AP according to the service discovery request frame; a remote subunit 602b configured to, when a search result of the search subunit 602a is that none of service information in the service information table of the first AP meets the M service query items, forward the service discovery request frame to a second AP, receive a service discovery response frame returned by the second AP, where the service discovery response frame returned by the second AP includes all service information that meets the M service query items and is in a service information table of the second AP, and obtain the service information included in the service discovery response frame returned by the second AP; and a local subunit 602c configured to, when a search result of the search subunit 602a is that at least one piece of service information existing in the service information table of the first AP meets the M service query items, obtain all service information that meets the M service query items and is in the service information table of the first AP.

Optionally, when the remote subunit 602B or the remote subunit 602b forwards the service discovery request frame of the first STA, the service discovery request may further carry a device address or a device identifier of the first STA, so that the second AP determines whether the service discovery request frame of the first STA has been processed.

Figure 7A:
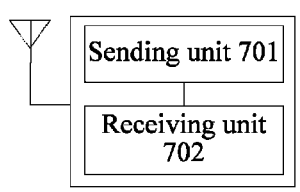
FIG. 7A and FIG. 7B are schematic structural diagrams of a STA for discovering a service according to an embodiment of the present invention.

FIG. 7A is a schematic structural diagram of a first STA for discovering a service according to an embodiment of the present invention. As shown in FIG. 7A, the first STA includes a sending unit 701 and a receiving unit 702.

The sending unit 701 is configured to send a service discovery request frame to a first AP, where the service discovery request frame includes M service query items.

Each service query item includes a query type and query content, and M is an integer greater than or equal to 0.

It should be noted that in this embodiment of the present invention, a STA needs to query a required service during a service discovery process, where the query type may be a query type name such as a BSSID, a device name, a device capability, a service name, and a service identifier, or may be a query type identifier; for example, one query type identifier is defined for each query type name, and usually the query type identifier is globally uniform, which is not limited in the present invention, as long as the technical solutions of the present invention can be implemented. Exemplarily, in a query type information table shown in FIG. 21, one query type identifier is defined for each query type name, which is not limited in the present invention.

Exemplarily, the service discovery request frame may be shown in FIG. 22, where Length after a Public Action field value field is variable and is used to represent a length of an action detail in the service discovery request frame, and Length in each service query item is variable and is used to represent a length of the query content.

The receiving unit 702 is configured to receive a service discovery response frame returned by the first AP, where the service discovery response frame includes a query result that meets the M service query items.

The query result may be all service information that meets the M service query items, or may be simplified service information that meets the M service query items.

The service information includes a BSSID, a device identifier, a service identifier, and a service name; the service information may further include a network access policy, a device name, a device capability, service description, and the like.

Exemplarily, the service information table may be shown in FIG. 23, where the BSSID is a MAC address of an AP associated with a STA that declares the service information, for example, a MAC address of the first AP in this embodiment.

For example, when M is 2, that is, a service discovery request frame includes two service query items, for example, the first service query item includes a query type being "service name" and query content being "printing", and the second service query item includes a query type being "device capability" and query content being "supporting Wi-Fi Direct", a query result is all service information that needs to meet that "service name" is "printing" and "device capability" is "supporting Wi-Fi Direct"; or may be all simplified service information that meets that "service name" is "printing" and "device capability" is "supporting Wi-Fi Direct", which is not limited in the present invention. As shown in FIG. 24, compared with service information, in simplified service information, query types being "service name" and "device capability" in a service query item are removed; returning of simplified service information can reduce an amount of information to be transmitted, thereby improving transmission efficiency.

It should be noted that, in this embodiment of the present invention, an example in which the query result is service information is used to describe the technical solution of the present invention, but does not constitute any limitation to the present invention.

Exemplarily, the service discovery response frame may be shown in FIG. 25, where Length is variable and is used to represent a length of an action detail in a service announcement response frame.

Definitely, the query result in the service discovery response frame may also be empty, which represents that the first AP does not discover service information that meets the M service query items. In the service discovery response frame shown in FIG. 25, a value of the Length field is 0.

Figure 7B:
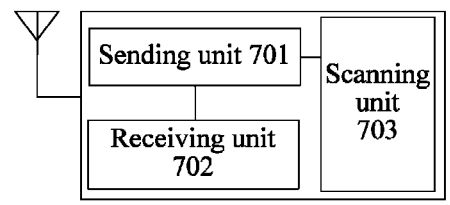

Optionally, as shown in FIG. 7B, the first STA further includes a scanning unit 703, where the scanning unit 703 is configured to receive a beacon frame sent in a broadcast manner by the first AP; or, the scanning unit 703 is configured to send a probe request frame in a broadcast manner, and receive a probe response frame returned by the first AP.

Using the scanning unit 703, the first STA can obtain information about an available AP, and request service directory information on the available AP.

When an active scanning manner is adopted, the scanning unit 703 is configured to send a probe request frame in a broadcast manner, where the probe request frame includes a service information element, and a Length field in the service information element is 0; and receive a probe response frame returned by the first AP, where the probe response frame includes the service information element, the service information element includes a service directory item, and the service directory item includes a BSSID, a service identifier, and a service name.

When a passive scanning manner is adopted, the scanning unit 703 is configured to receive a beacon frame sent in a broadcast manner by the first AP, where the beacon frame includes a service information element, the service information element includes a service directory item, and the service directory item includes a BSSID, a service identifier, and a service name.

Optionally, the first STA further includes a timing unit configured to, after the service discovery request frame is sent, set a timer; if a service discovery response frame returned by the first AP is not received within a set time of the timer, consider that current service discovery fails, so that the first STA may send a service discovery request frame to the first AP again, or may send a service discovery request frame to another AP.

By adopting the technical solution of discovering a service provided in this embodiment of the present invention, a first AP may serve as a proxy for a first STA to search for service information in a network, and the first AP may provide wider and richer service information to a user through a local search and a remote search, thereby meeting a user's demand of selecting a network according to a service requirement. Therefore, a STA that provides a service in the network also does not need to periodically listen to a search request of another device and on a channel, thereby reducing resource consumption and power consumption of a STA that provides a service. In addition, the first STA can obtain service information using the first AP both before association and after association, thereby avoiding a problem of frequent association and disassociation between different APs, which occurs because after being associated with an AP, the first STA discovers that a required service does not exist, and is then disassociated. This ensures that a user can more rapidly and accurately access a network that provides a service, and improves user experience.

Further, after being associated with the first AP, the first STA may declare, to the first AP, a service that the first STA can provide. The first AP may also spread, to another accessible adjacent AP in the network, the service information declared by the first STA.

Figure 8:
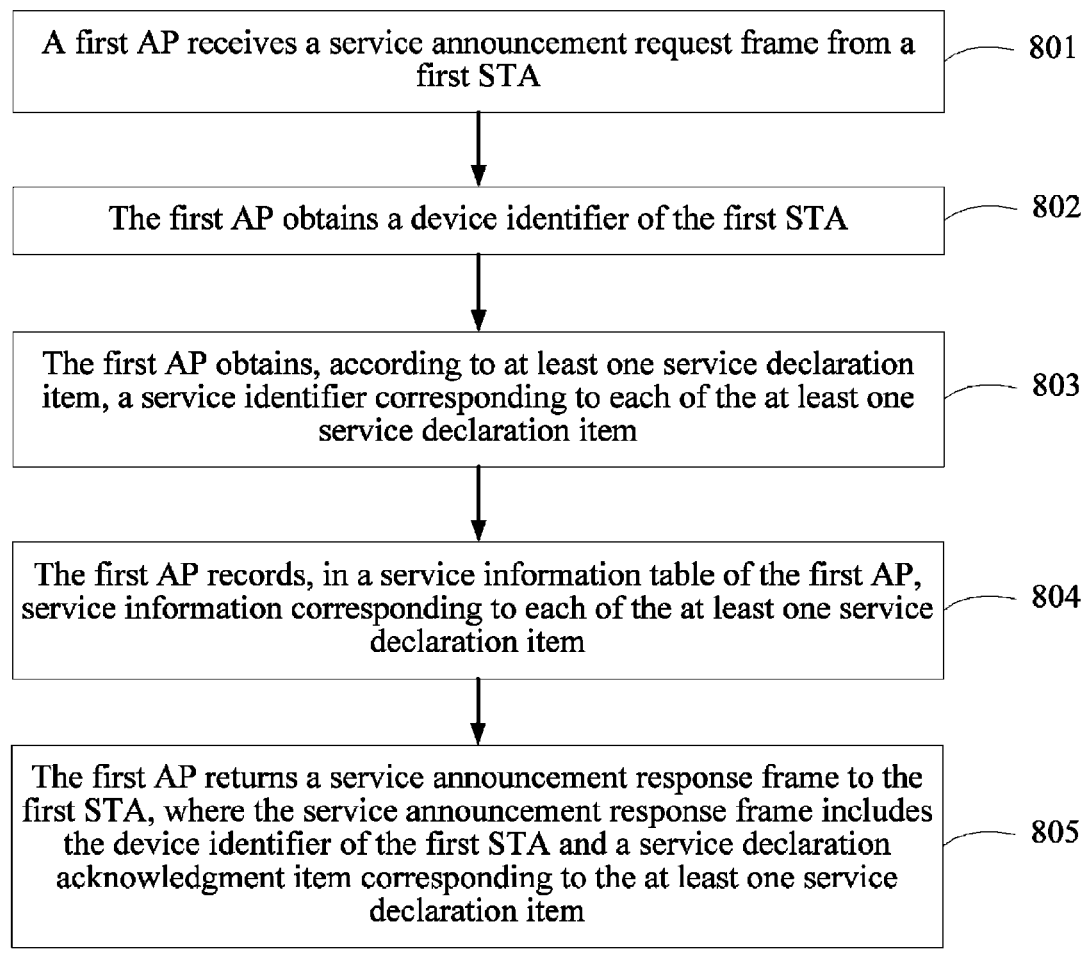
FIG. 8 is a flowchart of a method for registering a service according to an embodiment of the present invention.

FIG. 8 is a flowchart of a method for registering a service according to an embodiment of the present invention. In this embodiment, the method for registering a service is implemented by a first AP. As shown in FIG. 8, the method includes the following steps:

801. The first AP receives a service announcement request frame from a first STA, where the service announcement request frame includes a device address of the first STA and at least one service declaration item, and each of at least one service declaration item includes a service name.

After being associated with the first AP, the first STA may send a service announcement request frame to the first AP to register a service on the first AP.

The device address of the first STA is usually a MAC address of the first STA. The device address of the first STA is usually carried in a header of the service announcement request frame.

The service announcement request frame may further include a device name, a device identifier, a device capability, device description, and the like of the first STA. The device name of the first STA may be, for example, a printer or a television, or may be, for example, Cafe No. 1 and Ticket Center No. 2. The device capability of the first STA may be, for example, supporting Wi-Fi Direct or supporting Bluetooth; a capability parameter may further be carried in the device capability, for example, when Wi-Fi Direct is supported, a direct distance is carried. For example:

| Device Name | Device Capability |
|---|---|
| Printer | Supporting Wi-Fi Direct, a direct distance being L |
| Ticket Center No. 2 | Providing door-to-door service |

The service declaration item may further include, in addition to a service name, service description. For example, the foregoing Ticket Center No. 2 may provide the following services:

| Service Name | Service Description |
|---|---|
| Flight ticket booking | China Southern Airlines only |
| Train ticket booking | rapid-train ticket only |
| Ticket query | Within three days |

When the first STA can provide multiple services, the first STA may register the multiple services on the first AP once, where the service announcement request frame includes multiple service declaration items. The first STA may also register services on the first AP for multiple times, that is, register one service on the first AP each time, and register the services for multiple times. In this case, the service announcement request frame only includes one service declaration item each time.

Exemplarily, the service announcement request frame may be shown in FIG. 27, where Length is variable and is used to represent a length of an action detail in the service announcement request frame.

802. The first AP obtains a device identifier of the first STA.

The first AP queries an address correspondence table of the first AP according to the device address of the first STA, where the address correspondence table includes a correspondence between a device address and a device identifier; and when a device address in one existing address correspondence in the address correspondence table of the first AP is the same as the device address of the first STA, the first AP obtains a device identifier in the existing address correspondence, that is, the device identifier of the first STA; or when a device address in any address correspondence in the address correspondence table of the first AP is different from the device address of the first STA, the first AP allocates the device identifier of the first STA from a device identifier pool, and records, in the address correspondence table, an address correspondence between the device address of the first STA and the device identifier of the first STA.

Optionally, if the service announcement request frame includes the device identifier of the first STA, the first AP may also obtain the device identifier of the first STA from the service announcement request frame.

For example, the Ticket Center No. 2 whose device address is MAC1 has a device identifier DI-1, and a printer 1 whose device address is MAC2 has a device identifier DI-2.

803. The first AP obtains, according to the at least one service declaration item, a service identifier corresponding to each of the at least one service declaration item.

That is, that the first AP obtains a corresponding service identifier according to a service name of each service declaration item includes querying, by the first AP, a service information table of the first AP according to a service name of a first service declaration item in the at least one service declaration item; and when a service name in any piece of service information in the service information table of the first AP is different from the service name of the first service declaration item, allocating a first service identifier from a service identifier pool according to the service name of the first service declaration item; or when a service name in existing service information existing in the service information table of the first AP is the same as the service name of the first service declaration item, and a BSSID of the existing service information is the same as the MAC address of the first AP, obtaining a service identifier of the existing service information, that is, a first service identifier corresponding to the service name of the first service declaration item.

If there is also a second service declaration item, a second service identifier corresponding to a service name of the second service declaration item is obtained; and so on.

For example, the Ticket Center No. 2 sends a service announcement request frame, where the service announcement request frame includes two service declaration items, the first service declaration item has a service name being "flight ticket booking", and the second service declaration item has a service name being "train ticket booking", so that the first AP obtains a service identifier SI-1 according to "flight ticket booking", and then obtains a service identifier SI-2 according to "train ticket booking".

804. The first AP records, in the service information table of the first AP, service information corresponding to each of the at least one service declaration item, where the service information includes a BSSID, a device identifier, a service identifier, and a service declaration item.

The first AP obtains first service information, where the first service information includes a BSSID of the first AP, the device identifier of the first STA, the first service identifier, and the first service declaration item; and records the first service information in the service information table of the first AP.

If there is also a second service declaration item, second service information is obtained, and the second service information is recorded in the service information table of the first AP; and so on.

Optionally, the service information may further include the device name of the first STA, the device capability of the first STA, and a network access policy. The network access policy may represent an access policy inside a BSS to which the AP belongs, or may be an access policy for a specific service. For example, an AP1 is in a public network, an AP2 is in a private network, and the AP1 may access, according to an access policy of the AP2, the private network to which the AP2 belongs.

Exemplarily, the service information table may be shown in FIG. 23, where the BSSID is a MAC address of an AP associated with a STA that declares the service information, for example, the MAC address of the first AP in this embodiment.

805. The first AP returns a service announcement response frame to the first STA, where the service announcement response frame includes the device identifier of the first STA and a service declaration acknowledgment item corresponding to the at least one service declaration item, and the service declaration acknowledgment item includes a service identifier and a service name.

The service announcement response frame includes the device identifier of the first STA obtained in step 802; and a service declaration acknowledgment item corresponding to each of the at least one service declaration item, including a first declaration acknowledgment item corresponding to the first service declaration item, where the first declaration acknowledgment item includes the service name of the first service declaration item and the first service identifier; and if there is also a second service declaration item, a second declaration acknowledgment item corresponding to the second service declaration item, where the second declaration acknowledgment item includes the service name of the second service declaration item and the second service identifier; and so on.

Optionally, the service announcement response frame may further include the device name of the first STA.

Figure 28:
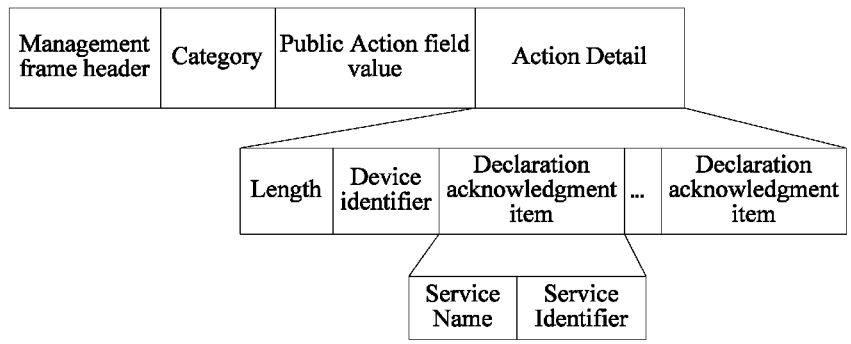
FIG. 28 is a schematic diagram of a service announcement response frame according to an embodiment of the present invention.

Exemplarily, the service announcement response frame may be shown in FIG. 28, where Length is variable and is used to represent a length of an action detail in the service announcement response frame.

By adopting the method for registering a service provided in this embodiment of the present invention, a first STA associated with a first AP may declare service information on the first AP; the first AP manages and maintains service information inside a BSS to which the first AP belongs, and provides a service search function. In this way, the first STA does not need to periodically listen to a search request of another device and on a channel, thereby reducing resource consumption and power consumption of the first STA.

It should be noted that the first AP may forward a service maintenance frame to another accessible adjacent AP in a wireless manner, and receive a service maintenance frame sent by another accessible adjacent AP. The first AP may also forward a service maintenance frame to another accessible adjacent AP in another manner. For example, when an AC exists in a WLAN, the first AP may bind and encapsulate a service maintenance frame using a data message in the CAPWAP protocol, and communicate with another accessible adjacent AP using the AC. For another example, when no AC exists in a WLAN and an AP is directly connected to an Ethernet, the first AP may communicate with another accessible adjacent AP using the TCP/IP, and encapsulate a service maintenance frame using the TCP/IP protocol. A manner in which the first AP and another accessible adjacent AP communicate with each other is not limited in the present invention. For ease of description, forwarding is generally used to describe communication between the first AP and another accessible adjacent AP in the following.

Figure 9A:
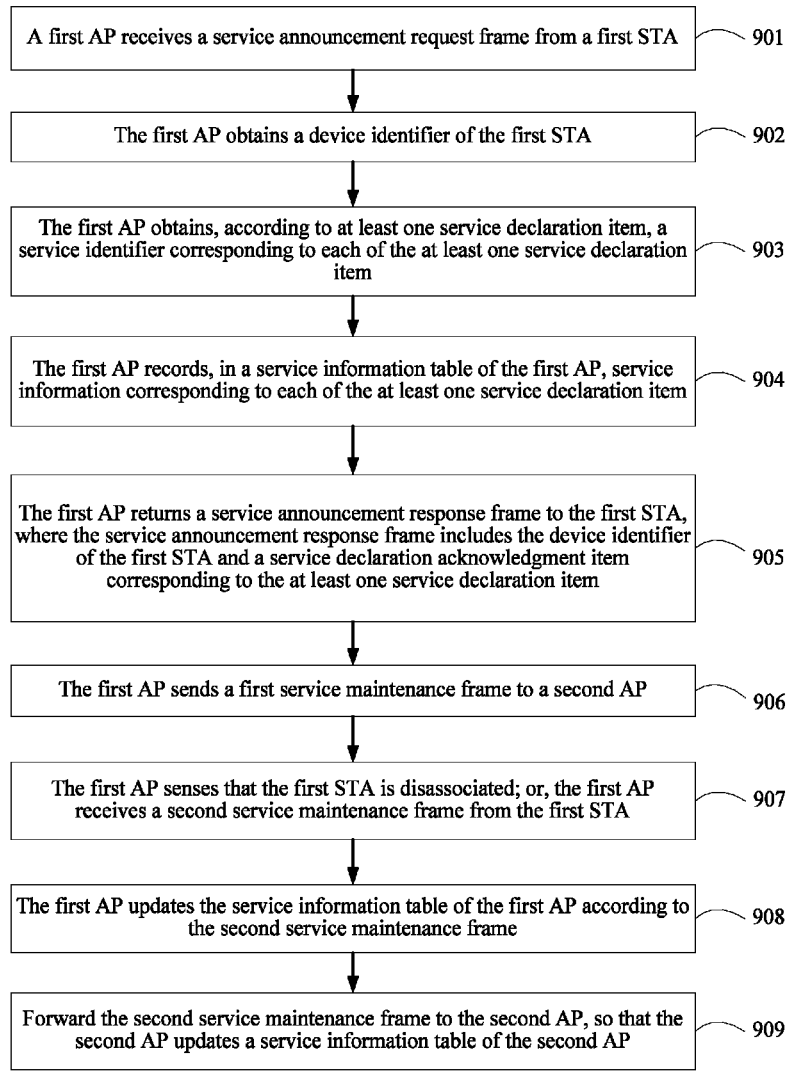
FIG. 9A and FIG. 9B are flowcharts of another method for registering a service according to an embodiment of the present invention.

FIG. 9A is a flowchart of another method for registering a service according to an embodiment of the present invention. In this embodiment, the technical solution of the present invention is further described on the basis of the method for registering a service shown in FIG. 8. As shown in FIG. 9A, the method includes the following steps:

901. A first AP receives a service announcement request frame from a first STA, where the service announcement request frame includes a device address of the first STA and at least one service declaration item, and each of the at least one service declaration item includes a service name.

Refer to step 801 for details, which are not described herein again.

902. The first AP obtains a device identifier of the first STA according to the device address of the first STA.

Refer to step 802 for details, which are not described herein again.

903. The first AP obtains, according to the at least one service declaration item, a service identifier corresponding to each of the at least one service declaration item.

Refer to step 803 for details, which are not described herein again.

904. The first AP records, in a service information table of the first AP, service information corresponding to the at least one service declaration item, where the service information includes a BSSID, a device identifier, a service identifier, and a service declaration item.

Refer to step 804 for details, which are not described herein again.

905. The first AP returns a service announcement response frame to the first STA, where the service announcement response frame includes the device identifier of the first STA and a service declaration acknowledgment item corresponding to the at least one service declaration item, and the service declaration acknowledgment item includes a service identifier and a service name.

Refer to step 805 for details, which are not described herein again.

Further, in this embodiment of the present invention, a STA may cancel, using a service maintenance frame, a service that has been declared, and an AP may update, using a service maintenance frame, a service information table of an accessible AP.

The service maintenance frame includes a maintenance state and a maintenance detail. The maintenance state includes a first maintenance state and a second maintenance state. The first maintenance state is used to, when a service declared by a STA is added on an AP, update and register the service on another accessible adjacent AP. The second maintenance state is used to, when a STA needs to cancel a service that has been declared, cancel the service on an AP; optionally, the AP updates and cancels the service on another accessible adjacent AP. The maintenance state may be represented by a character string; for example, Register represents the first maintenance state, and Cancel represents the second maintenance state. The maintenance state may also be represented by a number; for example, 1 represents the first maintenance state, and 0 represents the second maintenance state. The representation of the maintenance state is not limited in the present invention.

906. The first AP sends a first service maintenance frame to a second AP, where the first service maintenance frame includes a maintenance state and a maintenance detail, so that the second AP updates a service information table of the second AP.

The maintenance state in the first service maintenance frame is a first maintenance state, and the maintenance detail includes service information corresponding to each of the at least one service declaration item.

The first AP sends the first service maintenance frame to the second AP, and the first service maintenance frame includes a first maintenance state; and the service information corresponding to each of the at least one service declaration item, including first service information corresponding to a first service declaration item; and if there is also a second service declaration item, second service information corresponding to the second service declaration item; and so on.

The second AP is an accessible adjacent AP of the first AP. In this embodiment, the first AP may access the second AP in a wireless manner, or the first AP may access the second AP in a wired manner, as long as communication can be performed between the first AP and the second AP. An access manner is not limited in the present invention.

That the second AP updates the service information table of the second AP after receiving the first service maintenance frame includes recording, by the second AP in the service information table of the second AP according to the first maintenance state in the first service maintenance frame, the service information in the first service maintenance frame. Through 906, the first AP may spread, to a wider range in the network, the service information declared by the first STA, and serve as a proxy for the first STA to provide a service search function in a wider range to a user.

Further, all or some of services that have been declared on the first AP by the first STA may be canceled, and the method further includes the following steps:

907. The first AP senses that the first STA is disassociated; or, the first AP receives a second service maintenance frame from the first STA, where the second service maintenance frame includes a maintenance state and a maintenance detail.

The maintenance state in the second service maintenance frame is a second maintenance state, and the maintenance detail includes at least one service maintenance item.

The service maintenance item includes a BSSID, the device identifier, and the service identifier, where the service identifier identifies a service that has been declared by the first STA.

When the first AP senses that the first STA is disassociated, the first AP may cancel all the services that have been declared on the first AP by the first STA. All the service information declared by the first STA is deleted from the service information table of the first AP. Further optionally, the first AP may send a service maintenance frame to the second AP, so that the second AP updates the service information table of the second AP. For that the first AP senses that the first STA is disassociated, refer to an existing implementation manner, which is not limited in the present invention.

The first STA may also send, to the first AP, a service maintenance frame whose maintenance state is the second maintenance state, to cancel all or some of the services that have been declared on the first AP.

The BSSID and the device identifier in the service maintenance item in the second service maintenance frame that is received by the first AP and is from the first STA may be empty, so that the first AP may first obtain the BSSID, that is, a MAC address of the first AP, and a device identifier, that is, the device identifier of the first STA, where the first AP may query an address correspondence table of the first AP according to the device address of the first STA, and obtain the device identifier of the first STA; and then obtain, according to the obtained BSSID and device identifier and the service identifier of each service maintenance item in the at least one service maintenance item, all services that the first STA needs to cancel, and then perform subsequent processing.

Optionally, the service maintenance item in the second service maintenance frame that is received by the first AP and is from the first STA may be empty, which represents that the first STA needs to cancel all the services that have been declared.

Optionally, to prevent a malicious STA attack, when the first AP receives the second service maintenance frame, if the service maintenance item includes the BSSID and the device identifier, the first AP first authenticates whether the BSSID is the MAC address of the first AP, and whether the device identifier corresponds to the device address of the first STA; and if the BSSID is the MAC address of the first AP and the device identifier corresponds to the device address of the first STA, the first AP performs subsequent processing; otherwise, the first AP considers that the second service maintenance frame is a malicious attack, and skips processing.

908. The first AP updates the service information table of the first AP.

When the first AP senses that the first STA is disassociated, the first AP deletes, from the service information table of the first AP, all the service information declared by the first STA, which includes obtaining, by the first AP, a BSSID, that is, the MAC address of the first AP, and a device identifier, that is, the device identifier of the first STA, where the first AP may query an address correspondence table of the first AP according to the device address of the first STA, and obtain the device identifier of the first STA, and further update the service information table of the first AP according to the MAC address of the first AP and the device identifier of the first STA; the first AP queries the service information table of the first AP according to the MAC address of the first AP and the device identifier of the first STA, and deletes, from the service information table of the first AP, all service information whose BSSID is the same as the MAC address of the first AP and whose device identifier is the same as the device identifier of the first STA.

Then, the first AP may recycle, into a device identifier pool, the device identifier allocated to the first STA.

When the first AP receives the second service maintenance frame from the first STA, the first AP updates the service information table of the first AP according to the second service maintenance frame, which includes querying, by the first AP, the service information table of the first AP according to the first service maintenance item in the second service maintenance frame; when matched first service information exists, that is, a BSSID of the first service information in the service information table of the first AP is the same as a BSSID of the first service maintenance item in the second service maintenance frame, a service identifier of the first service information is the same as a service identifier in the first service maintenance item in the second service maintenance frame, and a device identifier in the first service information is the same as a device identifier in the first service maintenance item in the second service maintenance frame, deleting the first service information from the service information table of the first AP; and if a second service maintenance item further exists in the second service maintenance frame, querying the service information table of the first AP according to the second service maintenance item in the second service maintenance frame; when matched second service information exists, deleting the second service information from the service information table of the first AP; and so on.

Further optionally, a BSSID and a device identifier in a service maintenance item in the second service maintenance frame may be empty, so that the first AP may first obtain the BSSID, that is, the MAC address of the first AP, and a device identifier, that is, the device identifier of the first STA, and the first AP may query the address correspondence table of the first AP according to the device address of the first STA, and obtain the device identifier of the first STA. Correspondingly, the first AP queries the service information table of the first AP according to the MAC address of the first AP, the device identifier of the first STA, and the service identifier of the first service maintenance item in the second service maintenance frame; when matched first service information exists, that is, a BSSID of the first service information is the same as the MAC address of the first AP, the service identifier of the first service information is the same as the service identifier of the first service maintenance item in the second service maintenance frame, and the device identifier of the first service information is the same as the device identifier of the first STA, the first AP deletes the first service information from the service information table of the first AP; and if there is also a second service maintenance item in the second service maintenance frame, the first AP queries the service information table of the first AP according to the MAC address of the first AP, the device identifier of the first STA, and the service identifier of the second service maintenance item in the second service maintenance frame; when matched second service information exists, the first AP deletes the second service information from the service information table of the first AP; and so on.

If the first STA has canceled all the services that have been declared, the first AP may recycle, into the device identifier pool, the device identifier allocated to the first STA; if none of other STAs provides a service corresponding to a service identifier and canceled by the first STA, the first AP may recycle the service identifier into the service identifier pool.

909. Forward the second service maintenance frame to the second AP, so that the second AP updates the service information table of the second AP.

When the first AP senses that the first STA is disassociated, the first AP may send the second service maintenance frame to the second AP, where the second service maintenance frame includes a BSSID, that is, the MAC address of the first AP, and the device identifier of the first STA, so that the second AP updates the service information table of the second AP.

If a BSSID and a device identifier in a service maintenance item in the second service maintenance frame that is received by the first AP and is from the first STA are empty, the first AP updates the second service maintenance frame using the obtained BSSID, that is, the MAC address of the first AP and the device identifier of the first STA, and then forwards the updated second service maintenance frame to the second AP.

For actions executed by the second AP after receiving the second service maintenance frame, refer to the action of the first AP in 908, which are not described herein again.

It should be noted that, if an accessible adjacent AP of the first AP exists, the first AP performs the foregoing 906 and 909 to update a service information table of the accessible adjacent AP; if an accessible adjacent AP of the first AP does not exist, the first AP does not need to perform the foregoing 906 and 909.

Figure 29:
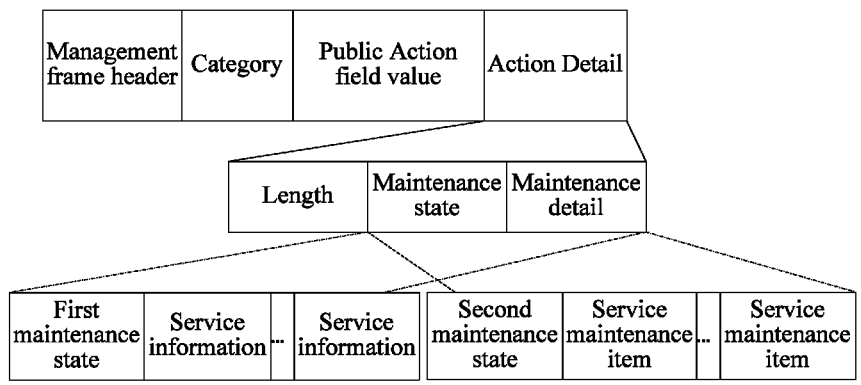
FIG. 29 is a schematic diagram of a service maintenance frame according to an embodiment of the present invention.

Exemplarily, the service maintenance frame may be shown in FIG. 29, where Length is variable and is used to represent a length of an action detail in the service maintenance frame.

Figure 9B:
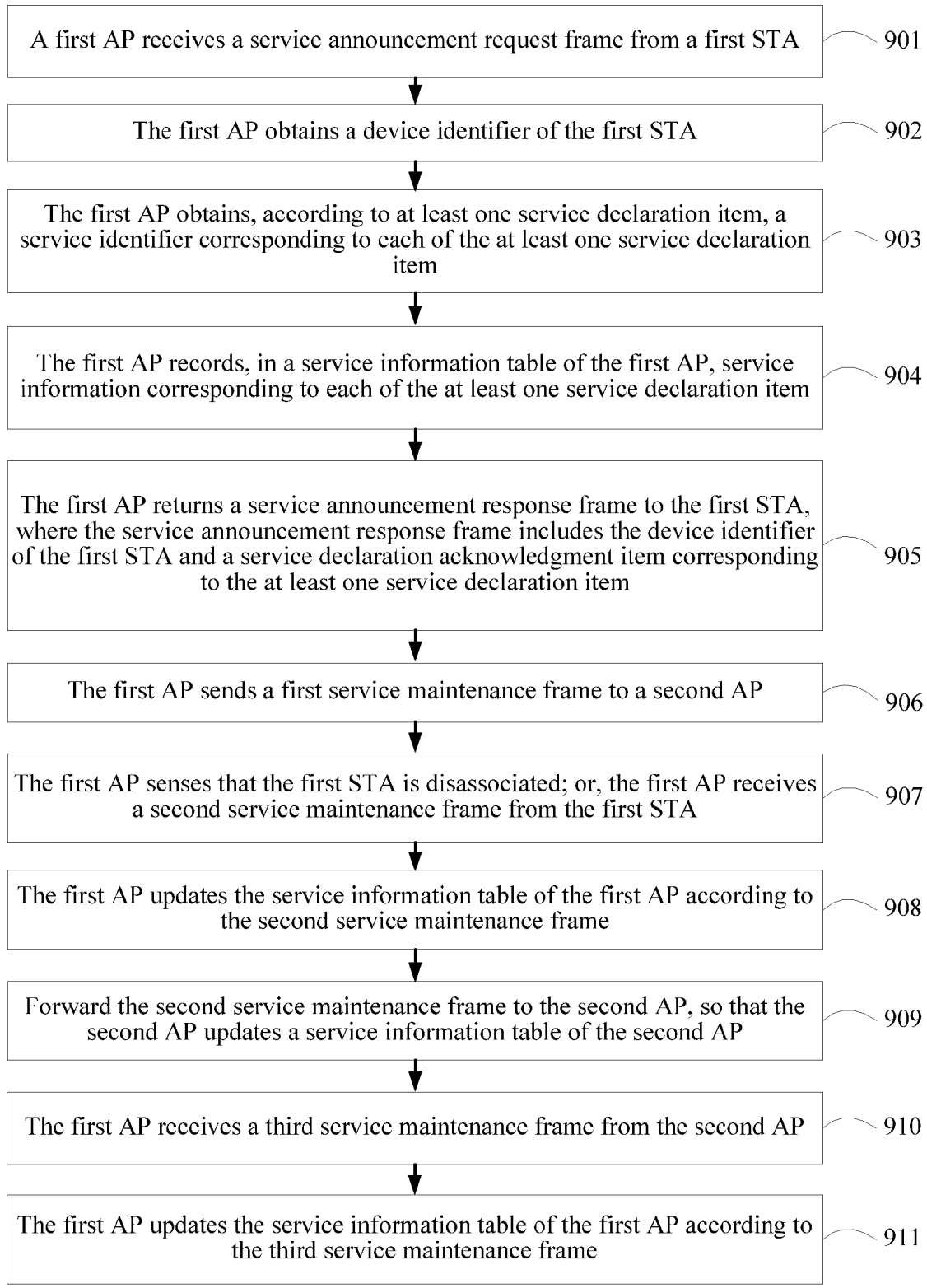

Further optionally, the first AP may further maintain service information spread by another accessible adjacent AP, and as shown in FIG. 9B, the method may further include the following steps:

910. The first AP receives a third service maintenance frame from the second AP, where the third service maintenance frame includes a maintenance state and a maintenance detail.

The maintenance state in the third service maintenance frame may be a first maintenance state, and correspondingly, the maintenance detail includes at least one piece of service information.

The maintenance state in the third service maintenance frame may also be a second maintenance state, and correspondingly, the maintenance detail includes at least one service maintenance item; the service maintenance item includes a BSSID, a device identifier, and a service identifier.

911. The first AP updates the service information table of the first AP according to the third service maintenance frame.

When the maintenance state in the third service maintenance frame is the first maintenance state, the first AP records, in the service information table of the first AP, the at least one piece of service information included in the third service maintenance frame.

When the maintenance state in the third service maintenance frame is the second maintenance state, the first AP queries the service information table of the first AP according to a first service maintenance item in the third service maintenance frame; when matched first service information exists, that is, a BSSID of the first service information in the service information table of the first AP is the same as a BSSID of the first service maintenance item in the third service maintenance frame, a service identifier of the first service information is the same as a service identifier of the first service maintenance item in the third service maintenance frame, and a device identifier of the first service information is the same as a device identifier of the first service maintenance item in the third service maintenance frame, the first AP deletes the first service information from the service information table of the first AP; if there is also a second service declaration item in the third service maintenance frame, queries the service information table of the first AP according to the second service maintenance item in the third service maintenance frame; when matched second service information exists, the first AP deletes the second service information from the service information table of the first AP; and so on.

A person skilled in the art may understand that 910 and 911 may be performed before or after any one of 901 to 909.

By adopting the method for registering a service provided in this embodiment of the present invention, a first STA associated with a first AP may declare or cancel service information on the first AP, the first STA does not need to periodically listen to a search request of another device and on a channel, thereby reducing resource consumption and power consumption of the first STA; the first AP may further spread, to an accessible adjacent AP in the network, device information and service information that are declared on the first AP, and may also receive service information provided by an accessible adjacent AP, to provide a service discovery function in a wider range and provide richer service information to a user, thereby meeting a user's demand of selecting a network according to a service requirement.

Figure 10A:
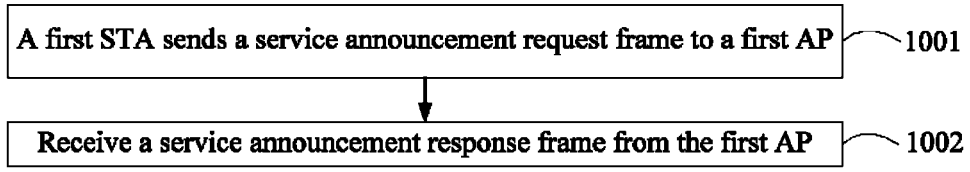
FIG. 10A and FIG. 10B are flowcharts of still another method for registering a service according to an embodiment of the present invention.

FIG. 10A is a flowchart of still another method for registering a service according to an embodiment of the present invention. In this embodiment, the method for registering a service is implemented by a first STA. As shown in FIG. 10A, the method includes the following steps:

1001. The first STA sends a service announcement request frame to a first AP, where the service announcement request frame includes a device address of the first STA and at least one service declaration item, and each of the at least one service declaration item includes a service name.

After being associated with the first AP, the first STA may send a service announcement request frame to the first AP to register a service on the first AP.

The device address of the first STA is usually a MAC address of the first STA, and the device address of the first STA is usually carried in a header of the service announcement request frame.

The service announcement request frame may further include a device name, a device identifier, a device capability, device description, and the like of the first STA. The device name of the first STA may be, for example, a printer and a television, or may be, for example, Cafe No. 1 and Ticket Center No. 2. The device capability of the first STA may be, for example, supporting Wi-Fi Direct or supporting Bluetooth; a capability parameter may further be carried in the device capability, for example, when Wi-Fi Direct is supported, a direct distance is carried. For example:

| Device Name | Device Capability |
|---|---|
| Printer | Supporting Wi-Fi Direct, a direct distance being L |
| Ticket Center No. 2 | Providing door-to-door service |

The service declaration item may further include, in addition to a service name, service description. For example, the foregoing Ticket Center No. 2 may provide the following services:

| Service Name | Service Description |
|---|---|
| Flight ticket booking | China Southern Airlines only |
| Train ticket booking | rapid-train ticket only |
| Ticket query | Within three days |

When the first STA can provide multiple services, the first STA may register the multiple services on the first AP once, where the service announcement request frame includes multiple service declaration items. The first STA may also register services on the first AP for multiple times, that is, register one service on the first AP each time, and register the services for multiple times. In this case, the service announcement request frame only includes one service declaration item each time.

Optionally, if the first STA registers a service on the first AP and after the device identifier of the first STA is obtained, when the first STA subsequently registers a service on the first AP, the device identifier of the first STA may be carried in the service announcement request frame.

Exemplarily, the service announcement request frame may be shown in FIG. 27, where Length is variable and is used to represent a length of an action detail in the service announcement request frame.

1002. Receive a service announcement response frame from the first AP, where the service announcement response frame includes the device identifier of the first STA and a service declaration acknowledgment item corresponding to each of the at least one service declaration item, and the service declaration acknowledgment item includes a service identifier and a service name.

The service declaration acknowledgment item corresponding to each of the at least one service declaration item includes a first declaration acknowledgment item corresponding to a first service declaration item, where the first declaration acknowledgment item includes a service name of the first service declaration item and a first service identifier; and if there is also a second service declaration item, a second declaration acknowledgment item corresponding to the second service declaration item, where the second declaration acknowledgment item includes a service name of the second service declaration item and a second service identifier; and so on.

Optionally, the service announcement response frame may further include the device name of the first STA.

Exemplarily, the service announcement response frame may be shown in FIG. 28, where Length is variable and is used to represent a length of an action detail in the service announcement response frame.

Optionally, after receiving the service announcement response frame, the first STA records the device identifier of the first STA and each service declaration acknowledgment item according to the service announcement response frame. The first STA may maintenance a service declaration information table, where the service declaration information table includes a BSSID, a device identifier, a service name, a service identifier, and the like.

Figure 10B:
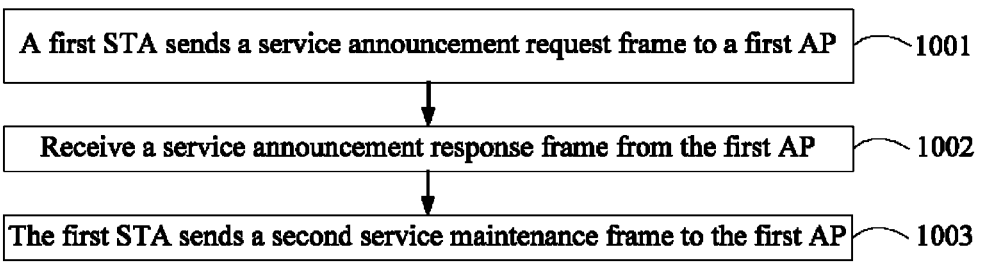

Optionally, when the first STA needs to cancel a service that has been declared, the first STA may send a service maintenance frame to the first AP to cancel all or some of services that have been declared. As shown in FIG. 10B, the method further includes the following steps:

1003. The first STA sends a second service maintenance frame to the first AP, where the second service maintenance frame includes a maintenance state and a maintenance detail.

The first STA sends the second service maintenance frame to the first AP, the maintenance state in the second service maintenance frame is a second maintenance state, and the maintenance detail includes at least one service maintenance item, so that the first AP updates a service information table of the first AP according to the second service maintenance frame, and optionally forwards the second service maintenance frame to a second AP, where the service maintenance item includes a BSSID, the device identifier, and the service identifier.

Optionally, the first STA deletes, from the service declaration information table, service declaration information corresponding to each service maintenance item in the at least one service maintenance item.

Optionally, the BSSID and the device identifier in the service maintenance item may be empty.

Optionally, the service maintenance item in the second service maintenance frame may be empty, which represents that the first STA needs to cancel all the services that have been declared.

Optionally, when the first STA is disassociated from the first AP, the first STA deletes all service declaration information from the service declaration information table.

By adopting the method for registering a service provided in this embodiment of the present invention, a first STA associated with a first AP may declare or cancel, on the first AP, device information and service information of the first STA, and the first AP provides service information to a user, thereby meeting a user's demand of selecting a network according to a service requirement; the first STA also does not need to periodically listen to a search request of another device and on a channel, thereby reducing resource consumption and power consumption of the first STA.

Figure 11A:
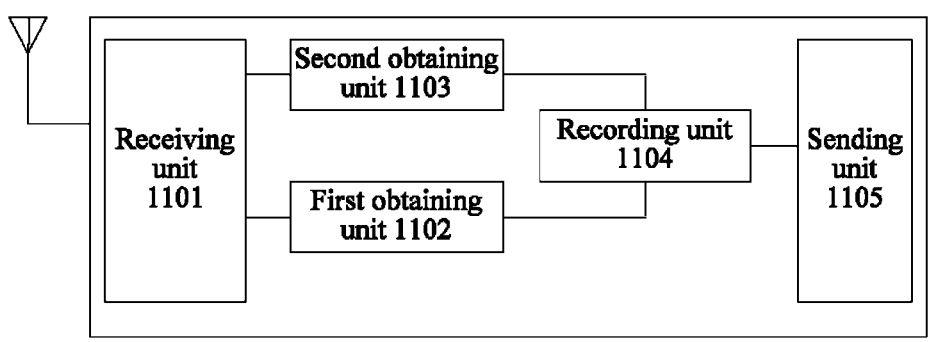
FIG. 11A and FIG. 11B are schematic structural diagrams of an AP for registering a service according to an embodiment of the present invention.

FIG. 11A is a schematic structural diagram of a first AP for registering a service according to an embodiment of the present invention, and the first AP is configured to implement the methods for registering a service shown in FIG. 8 and FIG. 9A of the present invention. As shown in FIG. 11A, the first AP includes a receiving unit 1101, a first obtaining unit 1102, a second obtaining unit 1103, a recording unit 1104, and a sending unit 1105.

The receiving unit 1101 is configured to receive a service announcement request frame from a first STA, where the service announcement request frame includes a device address of the first STA and at least one service declaration item, and each of the at least one service declaration item includes a service name.

The device address of the first STA is usually a MAC address of the first STA, and the device address of the first STA is usually carried in a header of the service announcement request frame.

The service announcement request frame may further include a device name, a device capability, device description, and the like of the first STA. The device name of the first STA may be, for example, a printer and a television, or may be, for example, Cafe No. 1 and Ticket Center No. 2. The device capability of the first STA may be, for example, supporting Wi-Fi Direct or supporting Bluetooth; a capability parameter may further be carried in the device capability, for example, when Wi-Fi Direct is supported, a direct distance is carried. For example:

| Device Name | Device Capability |
| --- | --- |
| Printer | Supporting Wi-Fi Direct, a direct distance being L |
| Ticket Center No. 2 | Providing door-to-door service |

The service declaration item may further include, in addition to a service name, service description. For example, the foregoing Ticket Center No. 2 may provide the following services:

| Service Name | Service Description |
| --- | --- |
| Flight ticket booking | China Southern Airlines only |
| Train ticket booking | rapid-train ticket only |
| Ticket query | Within three days |

Exemplarily, the service announcement request frame may be shown in FIG. 27, where Length is variable and is used to represent a length of an action detail in the service announcement request frame.

The first obtaining unit 1102 is configured to obtain a device identifier of the first STA.

The first obtaining unit 1102 is configured to query an address correspondence table of the first AP according to the device address of the first STA, where the address correspondence table includes a correspondence between a device address and a device identifier; and when a device address in one existing address correspondence in the address correspondence table of the first AP is the same as the device address of the first STA, obtain a device identifier in the existing address correspondence, that is, the device identifier of the first STA; or when a device address in any address correspondence in the address correspondence table of the first AP is different from the device address of the first STA, allocate the device identifier of the first STA from a device identifier pool, and record, in the address correspondence table, an address correspondence between the device address of the first STA and the device identifier of the first STA.

For example, the Ticket Center No. 2 whose device address is MAC1 has a device identifier DI-1, and a printer 1 whose device address is MAC2 has a device identifier DI-2.

Optionally, the service announcement request frame further includes the device identifier of the first STA, and the first obtaining unit is further configured to obtain the device identifier of the first STA from the service announcement request frame.

The second obtaining unit 1103 is configured to obtain, according to the at least one service declaration item, a service identifier corresponding to each of the at least one service declaration item.

The second obtaining unit 1103 is configured to query a service information table of the first AP according to a service name of a first service declaration item in the at least one service declaration item; and when a service name in any piece of service information in the service information table of the first AP is different from the service name of the first service declaration item, allocate a first service identifier from a service identifier pool according to the service name of the first service declaration item; or when a service name in existing service information existing in the service information table of the first AP is the same as the service name of the first service declaration item, and a BSSID of the existing service information is the same as a MAC address of the first AP, obtain a service identifier of the existing service information, that is, a first service identifier corresponding to the service name of the first service declaration item.

If there is also a second service declaration item, a second service identifier corresponding to a service name of the second service declaration item is obtained; and so on.

For example, the service announcement request frame includes two service declaration items, where the first service declaration item has a service name being "flight ticket booking" and the second service declaration item has a service name being "train ticket booking", so that the first AP obtains a service identifier SI-1 according to "flight ticket booking", and then obtains a service identifier SI-2 according to "train ticket booking".

The recording unit 1104 is configured to record, in the service information table of the first AP, service information corresponding to the at least one service declaration item, where the service information includes a BSSID, a device identifier, a service identifier, and a service declaration item.

The recording unit 1104 is configured to obtain first service information, where the first service information includes the MAC address of the first AP, the device identifier of the first STA, the first service identifier, and the first service declaration item; record the first service information in the service information table of the first AP; and if there is also a second service declaration item, obtain second service information, and record the second service information in the service information table of the first AP; and so on.

Optionally, the service information may further include the device name of the first STA, the device capability of the first STA, and a network access policy. The network access policy may represent an access policy inside a BSS to which the AP belongs, or may be an access policy for a specific service. For example, an AP1 is in a public network, an AP2 is in a private network, and the AP1 may access, according to an access policy of the AP2, the private network to which the AP2 belongs.

Exemplarily, the service information table may be shown in FIG. 23, where a BSSID is a MAC address of an AP associated with a STA that declares the service information, for example, the MAC address of the first AP in this embodiment.

The sending unit 1105 is configured to return a service announcement response frame to the first STA, where the service announcement response frame includes the device identifier of the first STA and a service declaration acknowledgment item corresponding to the at least one service declaration item, and the service declaration acknowledgment item includes a service identifier and a service name.

The service declaration acknowledgment item corresponding to each of the at least one service declaration item includes a first declaration acknowledgment item corresponding to the first service declaration item, where the first declaration acknowledgment item includes the service name of the first service declaration item and the first service identifier; and if there is also a second service declaration item, a second declaration acknowledgment item corresponding to the second service declaration item, where the second declaration acknowledgment item includes a service name of the second service declaration item and a second service identifier; and so on.

Optionally, the service announcement response frame may further include the device name of the first STA.

Exemplarily, the service announcement response frame may be shown in FIG. 28, where Length is variable and is used to represent a length of an action detail in the service announcement response frame.

Figure 11B:
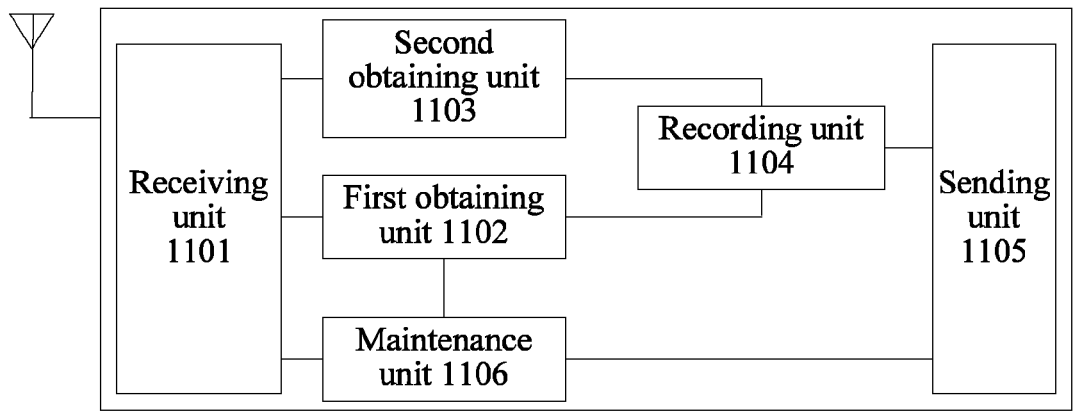

Further optionally, as shown in FIG. 11B, the first AP further includes a maintenance unit 1106, where the maintenance unit 1106 is configured to generate a first service maintenance frame, where the first service maintenance frame includes a first maintenance state and the service information corresponding to each of the at least one service declaration item.

The sending unit 1105 is further configured to send the first service maintenance frame to a second AP, so that the second AP updates a service information table of the second AP.

The service information includes a BSSID, a device identifier, a service identifier, and a service declaration item.

The second AP is an accessible adjacent AP of the first AP.

The service information corresponding to each of the at least one service declaration item includes first service information corresponding to the first service declaration item; and if there is also a second service declaration item, second service information corresponding to the second service declaration item; and so on.

The receiving unit 1101 is further configured to receive a second service maintenance frame from the first STA, where the second service maintenance frame includes a second maintenance state and at least one service maintenance item, and each of the at least one service maintenance item includes the BSSID, the device identifier, and the service identifier.

Correspondingly, the maintenance unit 1106 is further configured to update the service information table of the first AP according to the second service maintenance frame.

If an accessible adjacent AP of the first AP exists, the maintenance unit 1106 is further configured to forward the second service maintenance frame to the second AP, so that the second AP updates the service information table of the second AP.

The maintenance unit 1106 is configured to query the service information table of the first AP according to a first service maintenance item in the at least one service maintenance item; and when matched first service information exists, that is, a BSSID of the first service information in the service information table of the first AP is the same as a BSSID of the first service maintenance item, a service identifier of the first service information is the same as a service identifier of the first service maintenance item, and a device identifier of the first service information is the same as a device identifier of the first service maintenance item, delete the first service information from the service information table of the first AP.

If there is also a second service declaration item, the service information table of the first AP is queried according to a second service maintenance item; when matched second service information exists, the second service information is deleted from the service information table of the first AP; and so on.

Further optionally, a BSSID and a device identifier in a service maintenance item of the second service maintenance frame may be empty, and the maintenance unit 1106 is further configured to obtain a BSSID, that is, the MAC address of the first AP, and a device identifier, that is, the device identifier of the first STA; query the service information table of the first AP according to the MAC address of the first AP, the device identifier of the first STA, and the service identifier of the first service maintenance item in the second service maintenance frame; when matched first service information exists, that is, a BSSID of the first service information is the same as the MAC address of the first AP, a service identifier of the first service information is the same as the service identifier of the first service maintenance item in the second service maintenance frame, and a device identifier of the first service information is the same as the device identifier of the first STA, delete the first service information from the service information table of the first AP; if a second service maintenance item further exists in the second service maintenance frame, query the service information table of the first AP according to the MAC address of the first AP, the device identifier of the first STA, and a service identifier of a second service maintenance item in the second service maintenance frame; when matched second service information exists, delete the second service information from the service information table of the first AP; and so on.

The maintenance unit 1106 is further configured to, when it is sensed that the first STA is disassociated, cancel all services that have been declared on the first AP by the first STA. The maintenance unit 1106 is configured to obtain a BSSID, that is, the MAC address of the first AP, and a device identifier, that is, the device identifier of the first STA, query the service information table of the first AP according to the MAC address of the first AP and the device identifier of the first STA, and delete, from the service information table of the first AP, all service information whose BSSID is the same as the MAC address of the first AP same and whose device identifier is the same as the device identifier of the first STA.

The maintenance unit 1106 may obtain the device identifier of the first STA using the first obtaining unit 402.

The receiving unit 1101 is further configured to receive a third service maintenance frame from the second AP, where the third service maintenance frame includes a maintenance state and a maintenance detail.

Correspondingly, the maintenance unit 1106 is further configured to update the service information table of the first AP according to the third service maintenance frame.

The maintenance state in the third service maintenance frame may be a first maintenance state, and correspondingly the maintenance detail includes at least one piece of service information.

The maintenance state in the third service maintenance frame may also be a second maintenance state, and correspondingly, the maintenance detail includes at least one service maintenance item.

The maintenance unit 1106 is configured to, when the maintenance state in the third service maintenance frame is the first maintenance state, record in the service information table of the first AP, the at least one piece of service information included in the third service maintenance frame; or when the maintenance state in the third service maintenance frame is the second maintenance state, query the service information table of the first AP according to a first service maintenance item in the third service maintenance frame; when matched first service information exists, that is, a BSSID of the first service information in the service information table of the first AP is the same as a BSSID of the first service maintenance item in the third service maintenance frame, a service identifier of the first service information is the same as a service identifier of the first service maintenance item in the third service maintenance frame, and a device identifier of the first service information is the same as a device identifier of the first service maintenance item in the third service maintenance frame, delete the first service information from the service information table of the first AP; if there is also a second service declaration item in the third service maintenance frame, query the service information table of the first AP according to a second service maintenance item in the third service maintenance frame; when matched second service information exists, delete the second service information from the service information table of the first AP; and so on.

Exemplarily, the service maintenance frame may be shown in FIG. 29, where Length is variable and is used to represent a length of an action detail in the service maintenance frame.

Optionally, the first AP further includes an identifier recycling unit configured to recycle a device identifier and a service identifier.

The identifier recycling unit is configured to, when the first STA has canceled all the services that have been declared, recycle, into the device identifier pool, the device identifier allocated to the first STA, and when none of other STAs provides a service corresponding to a service identifier and canceled by the first STA, recycle the service identifier into the service identifier pool.

It should be noted that the first AP further includes an antenna configured to send and receive a wireless signal, and the antenna is connected to the receiving unit 1101 and the sending unit 1105.

Figure 12A:
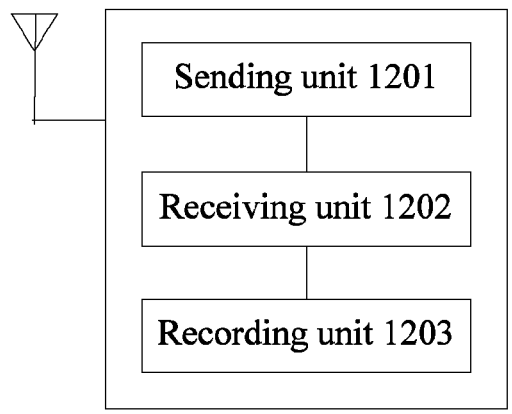
FIG. 12A and FIG. 12B are schematic structural diagrams of a STA for registering a service according to an embodiment of the present invention.

FIG. 12A is a schematic structural diagram of a first STA for registering a service according to an embodiment of the present invention, and the first STA is configured to implement the method for registering a service shown in FIG. 10A of the present invention. As shown in FIG. 12A, the first STA includes a sending unit 1201, a receiving unit 1202, and a recording unit 1203.

The sending unit 1201 is configured to send a service announcement request frame to a first AP, where the service announcement request frame includes a device address of the first STA and at least one service declaration item, and each of the at least one service declaration item includes a service name.

After being associated with the first AP, the first STA may send the service announcement request frame to the first AP to register a service on the first AP.

The device address of the first STA is usually a MAC address of the first STA, and the device address of the first STA is usually carried in a header of the service announcement request frame.

The service announcement request frame may further include a device name, a device capability, device description, and the like of the first STA. The device name of the first STA may be, for example, a printer and a television, or may be, for example, Cafe No. 1 and Ticket Center No. 2. The device capability of the first STA may be, for example, supporting Wi-Fi Direct or supporting Bluetooth; a capability parameter may further be carried in the device capability, for example, when Wi-Fi Direct is supported, a direct distance is carried. For example:

| Device Name | Device Capability |
| --- | --- |
| Printer | Supporting Wi-Fi Direct, a direct distance being L |
| Ticket Center No. 2 | Providing door-to-door service |

The service declaration item may further include, in addition to a service name, service description. For example, the foregoing Ticket Center No. 2 may provide the following services:

| Service Name | Service Description |
| --- | --- |
| Flight ticket booking | China Southern Airlines only |
| Train ticket booking | rapid-train ticket only |
| Ticket query | Within three days |

When the first STA can provide multiple services, the first STA may register the multiple services on the first AP once, where the service announcement request frame includes multiple service declaration items. The first STA may also register services on the first AP for multiple times, that is, register one service on the first AP each time, and register the services for multiple times. In this case, the service announcement request frame only includes one service declaration item each time.

Exemplarily, the service announcement request frame may be shown in FIG. 27, where Length is variable and is used to represent a length of an action detail in the service announcement request frame.

The receiving unit 1202 is configured to receive a service announcement response frame from the first AP, where the service announcement response frame includes a device identifier of the first STA and a service declaration acknowledgment item corresponding to each of the at least one service declaration item, and the service declaration acknowledgment item includes a service identifier and a service name.

The service declaration acknowledgment item corresponding to each of the at least one service declaration item includes a first declaration acknowledgment item corresponding to the first service declaration item, where the first declaration acknowledgment item includes a service name of the first service declaration item and a first service identifier; and if there is also a second service declaration item, a second declaration acknowledgment item corresponding to the second service declaration item, where the second declaration acknowledgment item includes a service name of the second service declaration item and a second service identifier; and so on.

Optionally, the service announcement response frame may further include the device name of the first STA.

Exemplarily, the service announcement response frame may be shown in FIG. 28, where Length is variable and is used to represent a length of an action detail in the service announcement response frame.

The recording unit 1203 is configured to record the device identifier of the first STA and each service declaration acknowledgment item according to the service announcement response frame.

The first STA may maintain a service declaration information table, where the service declaration information table includes a BSSID, a device identifier, a service name, a service identifier, and the like.

The recording unit 1203 is configured to record, in the service declaration information table, a BSSID, that is, a MAC address of the first AP, the device identifier of the first STA, the service name of the first declaration acknowledgment item, and the first service identifier; if there is also a second service declaration item, record a BSSID, that is, the MAC address of the first AP, the device identifier of the first STA, the service name of the second declaration acknowledgment item, and the second service identifier; and so on.

Figure 12B:
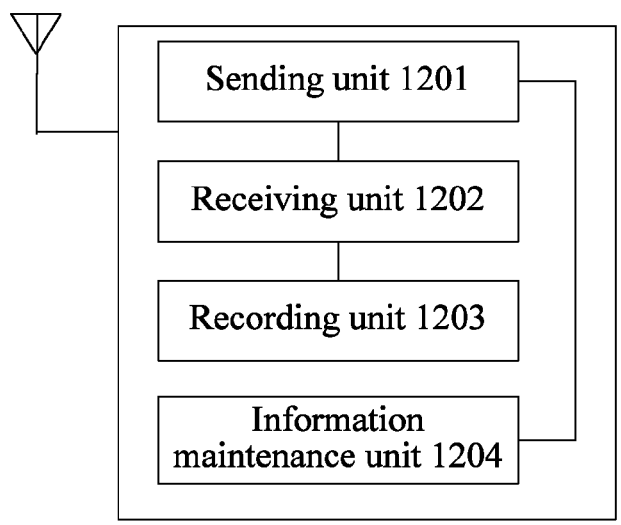

Further optionally, as shown in FIG. 12B, the first STA further includes an information maintenance unit 1204.

The sending unit 1201 is further configured to send a second service maintenance frame to the first AP, where the second service maintenance frame includes a maintenance state and a maintenance detail.

The sending unit 1201 is configured to send the second service maintenance frame to the first AP, where the maintenance state in the second service maintenance frame is a second maintenance state, and the maintenance detail includes at least one service maintenance item, so that the first AP updates the service information table of the first AP according to the second service maintenance frame, and optionally forwards the second service maintenance frame to a second AP, where the service maintenance item includes the BSSID, the device identifier, and the service identifier.

The BSSID and the device identifier in the service maintenance item may be empty.

The information maintenance unit 1204 is configured to delete service declaration information to be canceled from the service declaration information table, and the information maintenance unit 1204 is configured to delete service declaration information corresponding to each service maintenance item from the at least one service maintenance item in the second service maintenance frame.

Optionally, the information maintenance unit 1204 is further configured to, when the first STA is disassociated from the first AP, delete all service declaration information in the service declaration information table.

It should be noted that the first STA further includes an antenna configured to send and receive a wireless signal, and the antenna is connected to the receiving unit 1201 and the sending unit 1202.

Figure 13A:
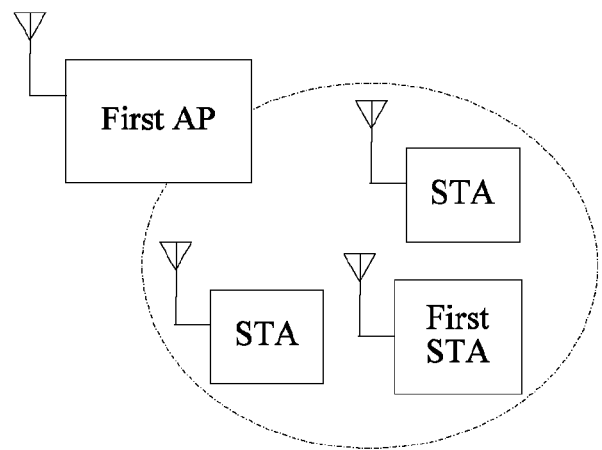
FIG. 13A and FIG. 13B are schematic structural diagrams of a system for registering a service according to an embodiment of the present invention.

FIG. 13A is a schematic structural diagram of a system for registering a service according to an embodiment of the present invention. The system includes the first AP shown in FIG. 11A of the present invention and the first STA shown in FIG. 12A of the present invention.

Figure 13B:
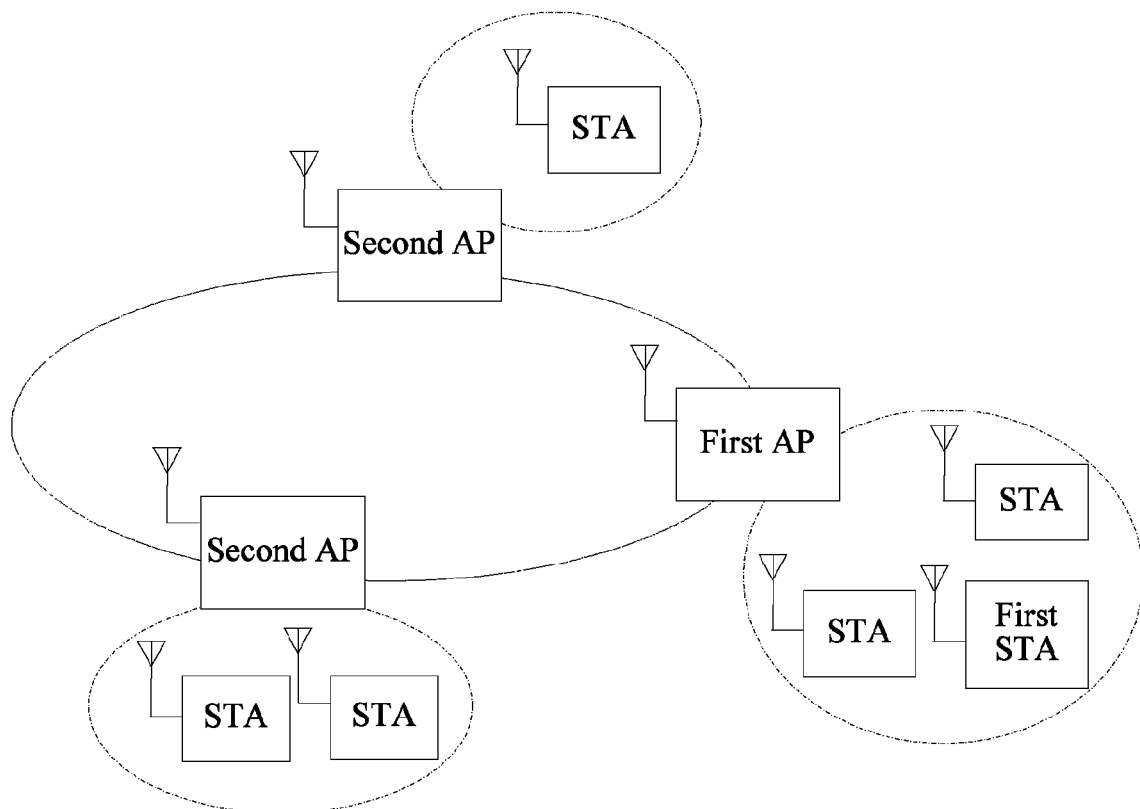

Optionally, as shown in FIG. 13B, the system may further include a second AP. Correspondingly, the first AP is shown in FIG. 11B of the present invention, and the first STA is shown in FIG. 12B.

The second AP may be reachable by the first AP in a wireless manner, and may further be reachable by the first AP in a wired manner, as long as communication can be performed between the first AP and the second AP, which is not limited in the present invention.

It should be noted that multiple accessible adjacent APs of the first AP may exist, that is, as shown in FIG. 13B, multiple second APs exist; two second APs are schematically shown in FIG. 13B.

Figure 14:
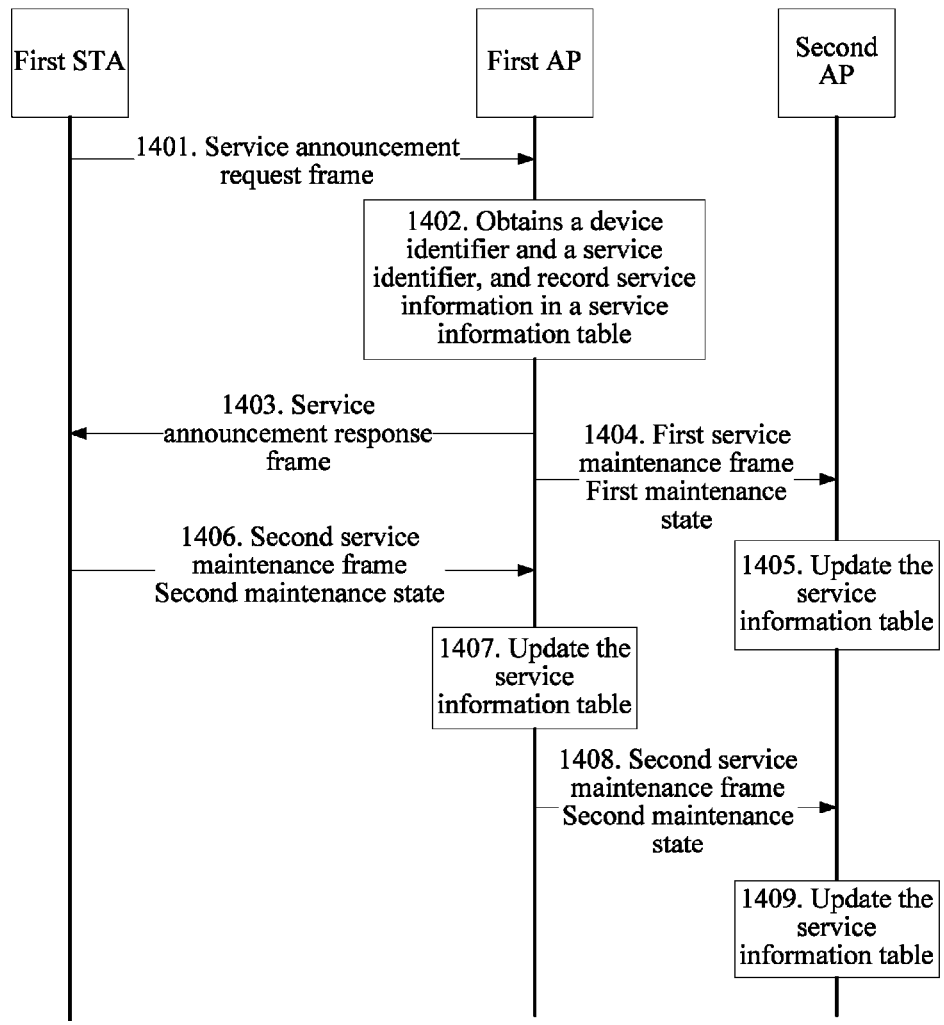
FIG. 14 is a schematic diagram of information interaction of registering a service according to an embodiment of the present invention.

FIG. 14 is a schematic diagram of information interaction of registering a service according to an embodiment of the present invention. The method for registering a service provided in the embodiment of the present invention is further introduced based on the system shown in FIG. 13B. As shown in FIG. 14, the method for registering a service includes the following steps:

1401. A first STA sends a service announcement request frame to a first AP, where the service announcement request frame includes a device address of the first STA and at least one service declaration item.

Refer to step 1001 in the embodiment of the present invention for details, which are not described herein again.

1402. After receiving the service announcement request frame, the first AP obtains a device identifier and a service identifier, and records corresponding service information in a service information table of the first AP.

The first AP obtains a device identifier of the first STA according to the device address of the first STA; obtains, according to the at least one service declaration item, a service identifier corresponding to each of the at least one service declaration item; and records, in the service information table of the first AP, service information corresponding to the at least one service declaration item, where the service information includes a BSSID, a device identifier, a service identifier, and a service declaration item.

Refer to steps 802 and 803 in the embodiment of the present invention for details, which are not described herein again.

1403. The first AP returns a service announcement response frame to the first STA, where the service announcement response frame includes the device identifier of the first STA and a service declaration acknowledgment item corresponding to the at least one service declaration item.

The service declaration acknowledgment item includes a service identifier and a service name.

Refer to step 805 in the embodiment of the present invention for details, which are not described herein again.

1404. The first AP sends a first service maintenance frame to a second AP, where the first service maintenance frame includes a maintenance state and a maintenance detail, the maintenance state in the first service maintenance frame is a first maintenance state, and the maintenance detail includes the service information corresponding to each of the at least one service declaration item, so that the second AP updates a service information table of the second AP.

Refer to 906 in the embodiment of the present invention for details, which are not described herein again.

1405. After receiving the first service maintenance frame, the second AP updates the service information table of the second AP according to the first service maintenance frame.

The second AP records, in the service information table of the second AP according to that the maintenance state in the first service maintenance frame is the first maintenance state, the service information included in the first service maintenance frame.

Refer to step 906 in the embodiment of the present invention for details, which are not described herein again.

1406. When the first STA needs to cancel a service that has been declared, the first STA sends a second service maintenance frame to the first AP.

The second service maintenance frame includes a second maintenance state and at least one service maintenance item, and the service maintenance item includes the BSSID, the device identifier, and the service identifier, where the service identifier identifies a service that has declared by the first STA.

Refer to step 1003 in the embodiment of the present invention for details, which are not described herein again.

1407. After receiving the second service maintenance frame, the first AP updates the service information table of the first AP.

The first AP updates the service information table of the first AP according to the service maintenance item in the second service maintenance frame.

Refer to step 908 in the embodiment of the present invention for details, which are not described herein again.

1408. The first AP forwards the second service maintenance frame to the second AP.

Refer to step 909 in the embodiment of the present invention for details, which are not described herein again.

1409. After receiving the second service maintenance frame, the second AP updates the service information table of the second AP.

The process during which the second AP updates the service information table of the second AP is the same as the process during which the first AP updates the service information table of the first AP. Refer to the process during which the first AP updates the service information table of the first AP in step 908 in the embodiment of the present invention for details.

By adopting the technical solution of registering a service provided in this embodiment of the present invention, a first STA associated with a first AP may declare or cancel service information on the first AP, and the first STA does not need to periodically listen to a search request of another device and on a channel, thereby reducing resource consumption and power consumption of the first STA; the first AP may further spread, to an accessible adjacent AP in a network, device information and service information that are declared on the first AP, and may also receive service information provided by an accessible adjacent AP, to provide a service discovery function in a wider range and provide richer service information to a user, thereby meeting a user's demand of selecting a network according to a service requirement. Moreover, because service information maintained on an AP is released by a STA that is authenticated and associated with the AP, security is ensured and reliability of a service is further ensured.

Based on the technical solutions of registering and discovering a service provided in the embodiments of the present invention, in the present invention, an AP may further serve as a proxy to discover a STA that provides a direct association service and manage direct communication between STAs. It should be noted that in this embodiment of the present invention, an example in which a device capability is "supporting Wi-Fi Direct" is used; however, this embodiment of the present invention is also applicable to a direct association service using other technologies, such as Bluetooth, which is not limited in the present invention.

It should be noted that in this embodiment of the present invention, a STA may request to obtain a direct association service from an AP or turn off a direct association service using a direct association service request frame including a service request state. The service request state includes a first request state and a second request state; for example, the first request state may be referred to as enable, and the second request state may be referred to as disable. When a service request state in a direct association service request frame is the first request state, it represents that the STA requests to obtain a direct association service; when a service request state is the second request state, it represents that the STA requests to turn off a direct association service. The service request state may be identified by a character string; for example, enable represents the first request state, and disable represents the second request state. The service request state may also be identified by a number; for example, 1 represents the first request state, and 0 represents the second request state. The identification of a service request state is not limited in the present invention.

Figure 15A:
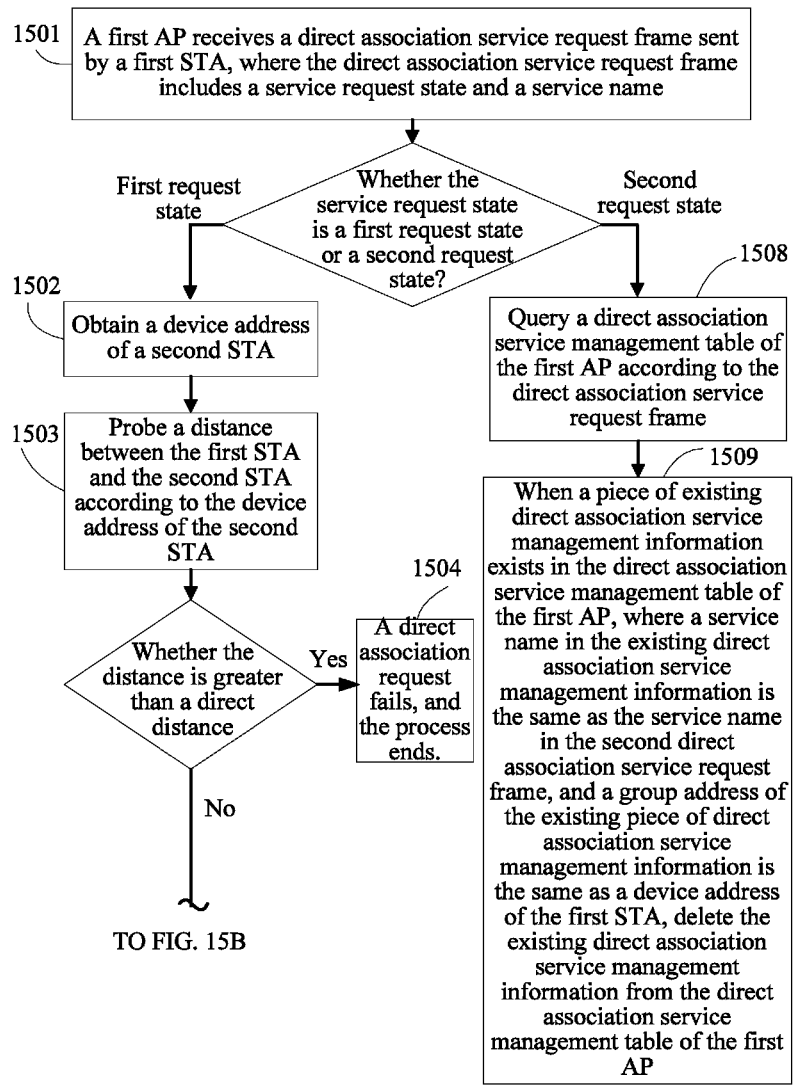
FIG. 15A and FIG. 15B are a flowchart of a method for managing a direct association service according to an embodiment of the present invention.
Figure 15B:
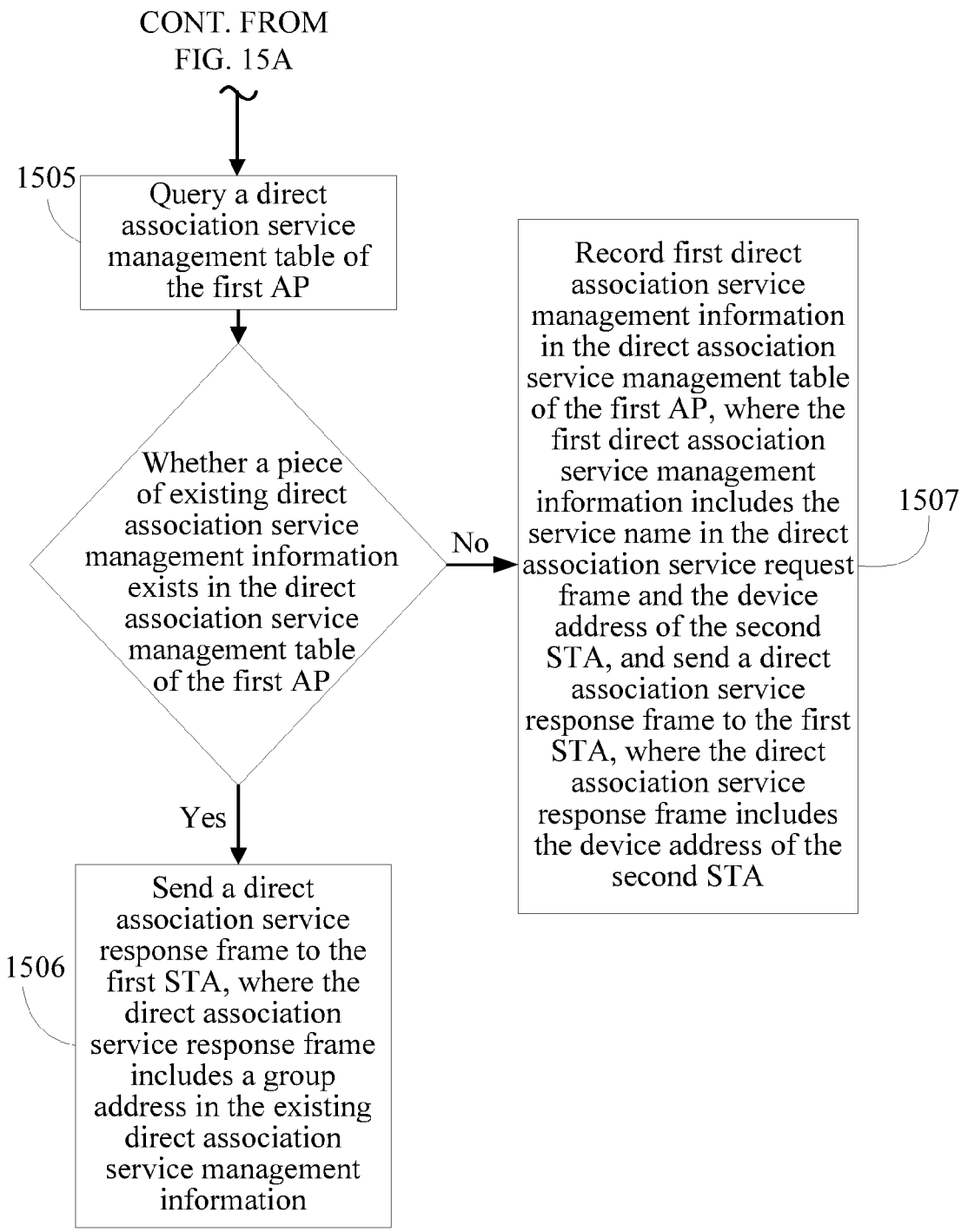

FIG. 15A and FIG. 15B are a flowchart of a method for managing a direct association service according to an embodiment of the present invention. In this embodiment, the method for managing a direct association service is implemented by a first AP. As shown in FIG. 15A and FIG. 15B, the method includes the following steps:

1501. The first AP receives a direct association service request frame sent by a first STA, where the direct association service request frame includes a service request state and a service name.

When the service request state is a first request state, the first AP performs steps 1502 to 1507; when the service request state is a second request state, the first AP performs steps 1508 and 1509.

The direct association service request frame may further include a device name.

Figure 30:
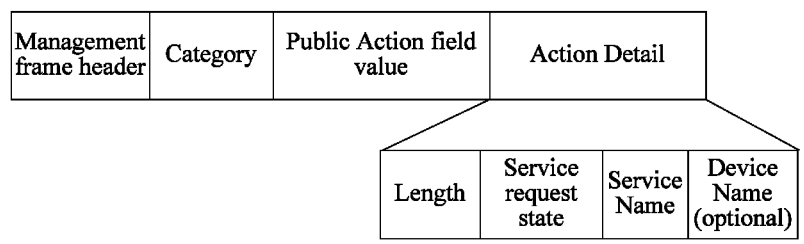
FIG. 30 is a schematic diagram of a direct association service request frame according to an embodiment of the present invention.

Exemplarily, the direct association service request frame may be shown in FIG. 30, where Length is variable and is used to represent a length of an action detail in the direct association service request frame.

In this embodiment, after obtaining an available AP through scanning and obtaining service directory information of the available AP, the first STA may request a direct association service from the first AP according to the service directory information.

The service name in the direct association service request frame may also be a service identifier; for example, when the service identifier is allocated in a globally uniform manner, a direct association service may be requested according to the service identifier. In this embodiment of the present invention, a service name is used as an example for description, but does not constitute any limitation to the present invention.

1502. The first AP obtains a device address of a second STA.

The first AP queries a service information table of the first AP according to the service name in the direct association service request frame.

When a service name in any piece of service information in the service information table of the first AP is different from the service name in the first direct association service request frame, a direct association request fails, and the process of obtaining a direct association service ends.

When a service name in existing service information existing in the service information table of the first AP is the same as the service name in the direct association service request frame, and a device capability in the existing service information is supporting Wi-Fi Direct, a device identifier of the existing service information, that is, a device identifier of the second STA is obtained; otherwise, a direct association request fails, and the process of obtaining a direct association service ends.

The device address of the second STA is obtained according to the device identifier of the second STA.

Optionally, when the direct association service request frame includes a device name, a device identifier in the direct association service request frame, that is, the device identifier of the second STA may also be obtained; the device address of the second STA may be obtained according to the device identifier of the second STA.

Because a direct association service has a requirement on a distance between devices, a direct association service is only provided by a STA associated with the first AP. When the first AP queries the service information table of the first AP, it further needs to be met that a BSSID is the same as a MAC address of the first AP.

That the first AP obtains the device address of the second STA according to the device identifier of the second STA includes querying, by the first AP, an address correspondence table of the first AP according to the device identifier of the second STA, and obtaining the device address of the second STA, where the address correspondence table includes a correspondence between a device address and a device identifier.

1503. The first AP probes a distance between the first STA and the second STA according to the device address of the second STA.

1504. When the distance between the first STA and the second STA is greater than a direct distance, a direct association request fails, and the process of obtaining a direct association service ends.

1505. When the distance between the first STA and the second STA is not greater than a direct distance, the first AP queries a direct association service management table of the first AP.

The direct distance may be a distance preset on the first AP, or may be carried in a device capability declared by the second STA. The manner is not limited in the present invention.

The direct association service management table includes a service name and a group address, and may further include channel information, a group identifier, a service identifier, and a device name.

Figures 31, 32:
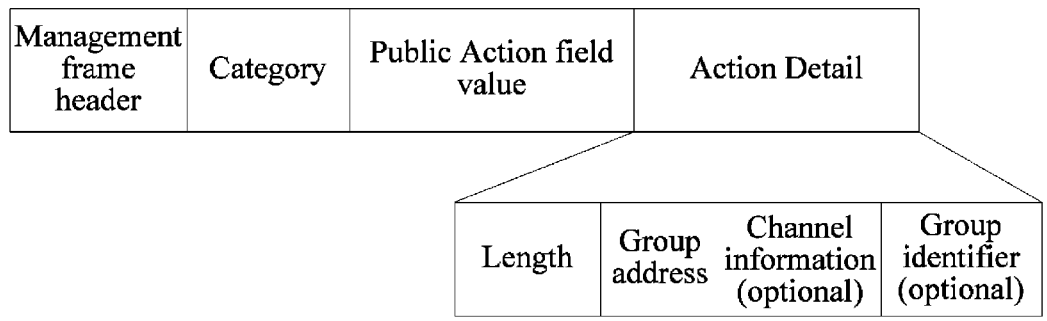
FIG. 31 is a schematic diagram of a direct association service management table according to an embodiment of the present invention.
FIG. 32 is a schematic diagram of a direct association service response frame according to an embodiment of the present invention.

Exemplarily, the direct association service management table may be shown in FIG. 31.

The group address is usually a device address of a STA that provides a direct association service.

1506. When one piece of existing direct association service management information exists in the direct association service management table of the first AP, where a service name in the existing direct association service management information is the same as the service name in the direct association service request frame, and a group address in the existing direct association service management information is the same as the device address of the second STA, the first AP sends a direct association service response frame to the first STA.

The direct association service response frame includes the group address in the existing direct association service management information, and may further include a group identifier and channel information.

1507. Otherwise, the first AP records first direct association service management information in the direct association service management table of the first AP, where the first direct association service management information includes the service name in the direct association service request frame and the device address of the second STA, and sends a direct association service response frame to the first STA.

The direct association service response frame includes the device address of the second STA.

The first AP sends the direct association service response frame to the first STA, where the direct association service response frame is used to suggest that the first STA and the second STA establish a direct association service. However, the first STA may decide whether to establish a direct association service to the second STA, or the first STA and the second STA determine through negotiation whether to establish a direct association service.

The first AP may further allocate, to the first STA, a wireless channel used for direct communication. The first direct association service management information may further include first channel information, where the first channel information includes information about the wireless channel that is allocated by the first AP to the first STA and used for direct communication, and a first direct association service response frame further includes the first channel information.

The first AP may further allocate a first group identifier to the direct association service request, where the first group identifier corresponds to the device address of the second STA; correspondingly, the first direct association service management information may further include the first group identifier, and the direct association service response frame further includes the first group identifier.

It should be noted that one group identifier may correspond to device addresses of multiple STAs that provide a same service.

Exemplarily, the direct association service response frame may be shown in FIG. 32, where Length is variable and is used to represent a length of an action detail in the direct association service response frame.

Because wireless signals easily interfere with each other and wireless channel resources are limited, the first AP allocates channel information of a direct association service, thereby avoiding mutual interference between direct communication between STAs and a signal of a channel on which the first AP is located, to ensure communication quality. It is also possible that the first AP does not allocate a channel, and direct communication between STAs can be performed on a specific channel, for example, a 2.4 gigahertz (GHz) channel 1, 6, or 11 currently used in a Wi-Fi Direct technology; or STAs may perform negotiation to select a channel to establish a direct association service. The manner is not limited in the present invention.

After receiving the direct association service response frame, the first STA may obtain the group address and the channel information from the direct association service response frame, and establish, on a corresponding channel, a direct association to the second STA, to further perform data interaction.

It should be noted that, in specific implementation, there may be multiple manners to distinguish whether a request succeeds or fails, as represented by the direct association service response frame. A state identifier may be further included in the direct association service response frame; for example, when the state identifier is 0, it represents that a request fails, and when the state identifier is 1, it represents that a request succeeds. The group identifier in the direct association service response frame may also be used for representation; for example, when the group identifier is −1, it represents that a request fails. It also represents that a request fails when Length in the direct association service response frame is 0, that is, the group identifier, the group address, and the channel information are all empty. The manner is not limited in this embodiment of the present invention.

When the service request state is a second request state, the first AP performs the following steps 1508 and 1509:

1508. The first AP queries the direct association service management table of the first AP according to the direct association service request frame.

The direct association service management table includes a service name and a group address, and may further include channel information, a group identifier, and a device identifier.

The group address is usually a device address of a STA that provides a direct association service.

1509. When one piece of existing direct association service management information exists in the direct association service management table of the first AP, where a service name in the existing direct association service management information is the same as the service name in the second direct association service request frame, and a group address in the existing direct association service management information is the same as a device address of the first STA, delete the existing direct association service management information from the direct association service management table of the first AP.

Optionally, the first AP may recycle a group identifier in the existing direct association service management information into a group identifier pool, and recycle a channel resource corresponding to channel information in the existing direct association service management information.

Optionally, after updating the direct association service management table, the first AP may return, to the first STA, an acknowledgment message, for example, an affirmative acknowledgment (ACK) message or a negative acknowledgment (NACK) message.

Figure 16:
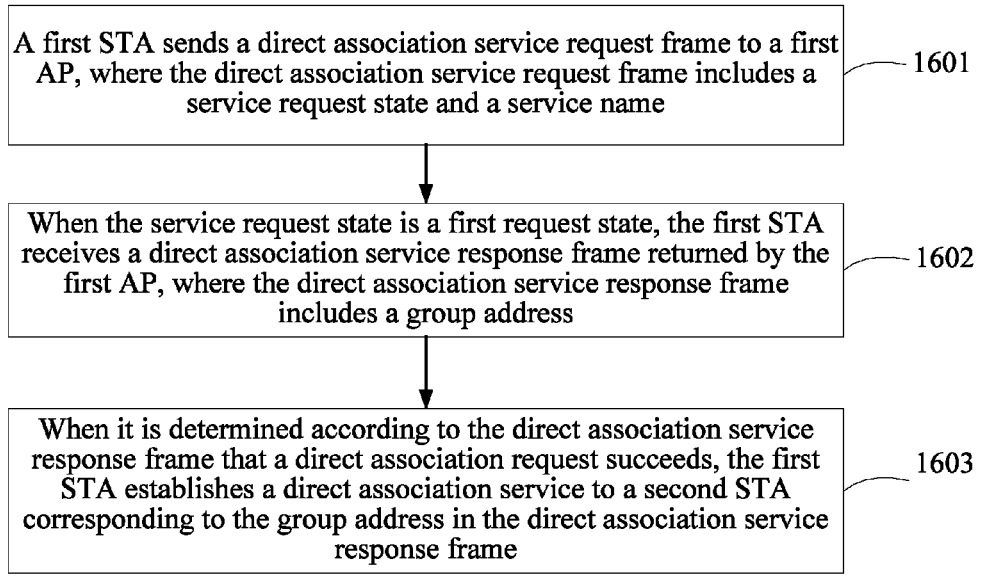
FIG. 16 is a flowchart of a method for obtaining a direct association service according to an embodiment of the present invention.

FIG. 16 is a flowchart of a method for obtaining a direct association service according to an embodiment of the present invention. In this embodiment, the method for obtaining a direct association service is implemented by a first STA. As shown in FIG. 16, the method includes the following steps:

1601. The first STA sends a direct association service request frame to a first AP, where the direct association service request frame includes a service request state and a service name.

The service name in the direct association service request frame may also be a service identifier; for example, when the service identifier is globally unique, a direct association service may be requested according to the service identifier. In this embodiment of the present invention, a service name is used as an example for description, but does not constitute any limitation to the present invention.

When the service request state in the direct association service request frame is a first request state, the direct association service request frame is used for the first STA to request to obtain a direct association service from the first AP. After obtaining an available AP through scanning and obtaining service directory information of the available AP, the first STA requests a direct association service from the first AP according to the service identifier.

Optionally, after obtaining service information using the method for discovering a service shown in FIG. 5A of the present invention, the first STA expects to establish a direct association service to a device that supports Wi-Fi Direct, and the first STA may further add a device name or a device identifier of the device in a direct association service request frame, to make a request to the first AP to establish a direct association service to the device. In this embodiment of the present invention, a device name is used as an example for description, but does not constitute any limitation to the present invention.

When the service request state in the direct association service request frame is a second request state, the direct association service request frame is used for the first STA to make a request to the first AP to turn off a direct association service provided by the first STA, so that the first AP deletes related direct association service management information and recycles a group identifier and a channel resource; refer to the method for managing a direct association service shown in FIG. 15A and FIG. 15B for details, which are not described herein again. When a STA that supports a Wi-Fi Direct function is not in a working state, by turning off a Wi-Fi Direct association service, resource consumption of the device may be reduced to release an available channel resource. Optionally, when the service request state is a second request state, the first STA receives an acknowledgment message, for example, an ACK message or a NACK message, returned by the first AP.

Exemplarily, the direct association service request frame may be shown in FIG. 30, where Length is variable and is used to represent a length of an action detail in the direct association service request frame.

When the service request state is a first request state, perform steps 1602 and 1603.

1602. The first STA receives a direct association service response frame returned by the first AP.

The direct association service response frame includes a group address, and may further include a group identifier and channel information.

The group address is usually a device address of a STA that provides a direct association service.

Exemplarily, the direct association service response frame may be shown in FIG. 32, where Length is variable and is used to represent a length of an action detail in the direct association service response frame.

1603. When it is determined according to the direct association service response frame that a direct association request succeeds, the first STA establishes a direct association service to a second STA corresponding to the group address in the direct association service response frame.

Optionally, if the direct association service response frame further includes channel information, that the first STA establishes a direct association service to the second STA corresponding to the group address in the direct association service response frame is establishing, by the first STA and on a wireless channel corresponding to the channel information, a direct association service to the second STA.

Because wireless signals easily interfere with each other and wireless channel resources are limited, the first AP allocates channel information of a direct association service, thereby avoiding mutual interference between direct communication between STAs and a signal of a channel on which the first AP is located, to ensure communication quality. It is also possible that the first AP does not allocate a channel, and direct communication between STAs can be performed on a specific channel, for example, a 2.4 G Hz channel 1, 6, or 11 currently used in a Wi-Fi Direct technology; or STAs may perform negotiation to select a channel to establish a direct association service. The manner is not limited in the present invention.

After establishing a direct association to the second STA, the first STA may perform data interaction.

When it is determined according to the direct association service response frame that a direct association request fails, the procedure ends.

It should be noted that, in specific implementation, there may be multiple manners to distinguish whether a request succeeds or fails, as represented by the direct association service response frame. A state identifier may be further included in the direct association service response frame; for example, when the state identifier is 0, it represents that a request fails, and when the state identifier is 1, it represents that a request succeeds. The group identifier in the direct association service response frame may also be used for representation; for example, when the group identifier is −1, it represents that a request fails. It also represents that a request fails when Length in the direct association service response frame is 0, that is, the group identifier, the group address, and the channel information are all empty. The manner is not limited in this embodiment of the present invention.

Figure 17:
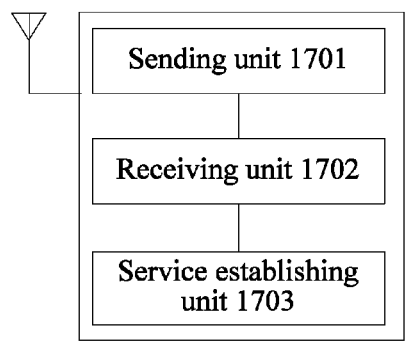
FIG. 17 is a structural diagram of a STA for obtaining a direct association service according to an embodiment of the present invention.

As shown in FIG. 17, FIG. 17 is a schematic structural diagram of a first STA for obtaining a direct association service provided in an embodiment of the present invention. The first STA includes a sending unit 1701, a receiving unit 1702, and a service establishing unit 1703.

The sending unit 1701 is configured to send a direct association service request frame to a first AP, where the direct association service request frame includes a service request state and a service name.

The service name in the direct association service request frame may also be a service identifier; for example, when the service identifier is globally unique, a direct association service may be requested according to the service identifier. In this embodiment of the present invention, a service name is used as an example for description, but does not constitute any limitation to the present invention.

Exemplarily, the direct association service request frame may be shown in FIG. 30, where Length is variable and is used to represent a length of an action detail in the direct association service request frame.

When the service request state is a first request state, after obtaining through scanning an available AP and obtaining service directory information of the available AP, the first STA may request a direct association service from the first AP according to the service identifier. Optionally, the direct association service request frame may further include a device name or a device identifier. After obtaining the service information using the method for discovering a service shown in FIG. 5A of the present invention, the first STA expects to establish a direct association service to a device that supports Wi-Fi Direct, and the first STA may further add a device name or a device identifier of the device in the direct association service request frame, to make a request to the first AP to establish a direct association service to the device.

The receiving unit 1702 is configured to receive a direct association service response frame returned by the first AP, where the direct association service response frame includes a group address, and may further include a group identifier and channel information.

The group address is usually a device address of a STA that provides a direct association service.

Because wireless signals easily interfere with each other and wireless channel resources are limited, the first AP allocates channel information of a direct association service, thereby avoiding mutual interference between direct communication between STAs and a signal of a channel on which the first AP is located, to ensure communication quality. It is also possible that the first AP does not allocate a channel, and direct communication between STAs can be performed on a specific channel, for example, a 2.4 GHz channel 1, 6, or 11 currently used in a Wi-Fi Direct technology; or STAs may perform negotiation to select a channel to establish a direct association service. The manner is not limited in the present invention.

Exemplarily, the direct association service response frame may be shown in FIG. 32, where Length is variable and is used to represent a length of an action detail in the direct association service response frame.

The service establishing unit 1703 is configured to, when it is determined according to the direct association service response frame that a direct association request succeeds, establish a direct association service to a second STA corresponding to the group address in the direct association service response frame.

Optionally, if the direct association service response frame further includes channel information, the service establishing unit 1703 is configured to establish, on a wireless channel corresponding to the channel information, a direct association service to the second STA.

Optionally, the first STA further includes a determining unit configured to determine, according to the direct association service response frame, whether a direct association service request succeeds.

In specific implementation, there may be multiple manners to determine whether a direct association service request succeeds. A state identifier may be further included in the direct association service response frame; for example, when the state identifier is 0, it represents that a request fails, and when the state identifier is 1, it represents that a request succeeds. The group identifier in the direct association service response frame may also be used for representation; for example, when the group identifier is −1, it represents that a request fails. It also represents that a request fails when Length in the direct association service response frame is 0, that is, the group identifier, the group address, and the channel information are all empty. The manner is not limited in this embodiment of the present invention.

When the service request state is a second request state, the direct association service request frame is used for the first STA to make a request to the first AP to turn off a direct association service provided by the first STA, so that the first AP deletes related direct association service management information and recycles a group identifier and a channel resource; refer to the method for managing a direct association service shown in FIG. 15A and FIG. 15B for details, which are not described herein again. When a STA that supports a Wi-Fi Direct function is not in a working state, by turning off a Wi-Fi Direct association service, resource consumption of the device may be reduced to release an available channel resource.

Optionally, when the service request state is a second request state, the receiving unit 1702 is further configured to receive an acknowledgment message, for example, ACK or NACK, returned by the first AP.

It should be noted that, the first STA further includes an antenna configured to send and receive a wireless signal, and the antenna is connected to the sending unit 1701 and the receiving unit 1702.

Figure 18A:
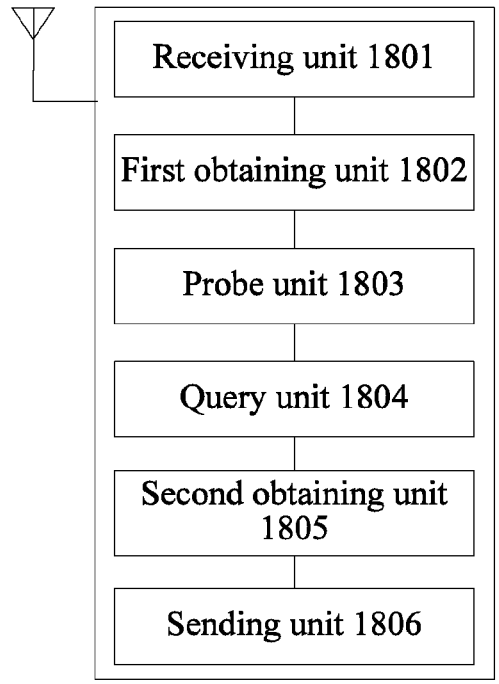
FIG. 18A and FIG. 18B are structural diagrams of an AP for managing a direct association service according to an embodiment of the present invention.

FIG. 18A is a schematic structural diagram of a first AP for managing a direct association service according to an embodiment of the present invention. The first AP includes a receiving unit 1801, a first obtaining unit 1802, a probe unit 1803, a query unit 1804, a second obtaining unit 1805, and a sending unit 1806.

The receiving unit 1801 is configured to receive a direct association service request frame from a first STA.

The direct association service request frame includes a service request state and a service name, and may further include a device name.

The service name and the device name in the direct association service request frame may also be a service identifier and a device identifier, respectively. For example, when the service identifier and the device identifier are allocated in a globally uniform manner, a direct association service may be requested according to the service identifier and the device identifier. In this embodiment of the present invention, a service name and a device name are used as an example for description, but do not constitute any limitation to the present invention.

Exemplarily, the direct association service request frame may be shown in FIG. 30, where Length is variable and is used to represent a length of an action detail in the direct association service request frame.

The first obtaining unit 1802 is configured to, when the service request state is a first request state, obtain a device address of a second STA.

The first obtaining unit 1802 is configured to query a service information table of the first AP according to the service name in the direct association service request frame; when a service name in existing service information existing in the service information table of the first AP is the same as the service name in the direct association service request frame, and a device capability in the existing service information is supporting Wi-Fi Direct, obtain a device identifier of the existing service information, that is, a device identifier of the second STA; and obtain the device address of the second STA according to the device identifier of the second STA; or when the direct association service request frame includes a device name, obtain a device identifier in the direct association service request frame, that is, a device identifier of the second STA, and obtain the device address of the second STA according to the device identifier of the second STA. Because a direct association service has a requirement on a distance between devices, a direct association service is only provided by a STA associated with the first AP. When the first AP queries the service information table of the first AP, it further needs to be met that a BSSID is the same as a MAC address of the first AP.

That the first obtaining unit 1802 is configured to query an address correspondence table of the first AP according to the device identifier of the second STA, and obtain the device address of the second STA, where the address correspondence table includes a correspondence between a device address and a device identifier.

The probe unit 1803 is configured to probe a distance between the first STA and the second STA according to the device address of the second STA obtained by the first obtaining unit 1802.

The query unit 1804 is configured to query a direct association service management table of the first AP.

Exemplarily, the direct association service management table may be shown in FIG. 31.

The query unit 1804 is configured to, when the service request state is a first request state, when the distance that is between the first STA and the second STA and is probed by the probe unit 1803 is not greater than a direct distance, query the direct association service management table of the first AP according to the service name in the direct association service request frame and the device address of the second STA.

The direct association service management table includes a service name and a group address, and may further include channel information, a group identifier, a service identifier, and a device name.

The group address is usually a device address of a STA that provides a direct association service.

The direct distance may be a distance preset on the first AP, or may be carried in a device capability declared by the second STA. The manner is not limited in the present invention.

The second obtaining unit 1805 is configured to obtain direct association service management information for a direct association service request of the first STA, and is configured to, when one piece of existing direct association service management information exists in the direct association service management table of the first AP, where a service name in the existing direct association service management information is the same as the service name in the direct association service request frame, and a group address in the existing direct association service management information is the same as the device address of the second STA, obtain the existing direct association service management information; or when a service name and a group address in any piece of direct association service management information in the direct association service management table of the first AP are different from the service name in the direct association service request frame and the device address of the second STA, obtain first direct association service management information, and record the first direct association service management information in the direct association service management table of the first AP, where the first direct association service management information includes the service name in the direct association service request frame and the device address of the second STA, and the direct association service management information may further include a first group identifier and first channel information.

The first channel information includes information about a wireless channel that is allocated by the first AP to the first STA and used for direct communication. The first group identifier corresponds to the device address of the second STA, and is a group identifier allocated by the first AP for a direct association service request of the first STA. It should be noted that one group identifier may correspond to device addresses of multiple STAs that provide a same service.

The sending unit 1806 is configured to send a direct association service response frame to the first STA according to the direct association service management information obtained by the obtaining unit 1805.

The direct association service response frame includes a group address, and may further include a group identifier and channel information.

Because wireless signals easily interfere with each other and wireless channel resources are limited, the first AP allocates channel information of a direct association service, thereby avoiding mutual interference between direct communication between STAs and a signal of a channel on which the first AP is located, to ensure communication quality. It is also possible that the first AP does not allocate a channel, and direct communication between STAs can be performed on a specific channel, for example, a 2.4 GHz channel 1, 6, or 11 currently used in a Wi-Fi Direct technology; or STAs may perform negotiation to select a channel to establish a direct association service. The manner is not limited in the present invention.

Exemplarily, the direct association service response frame may be shown in FIG. 32, where Length is variable and is used to represent a length of an action detail in the direct association service response frame.

Figure 18B:
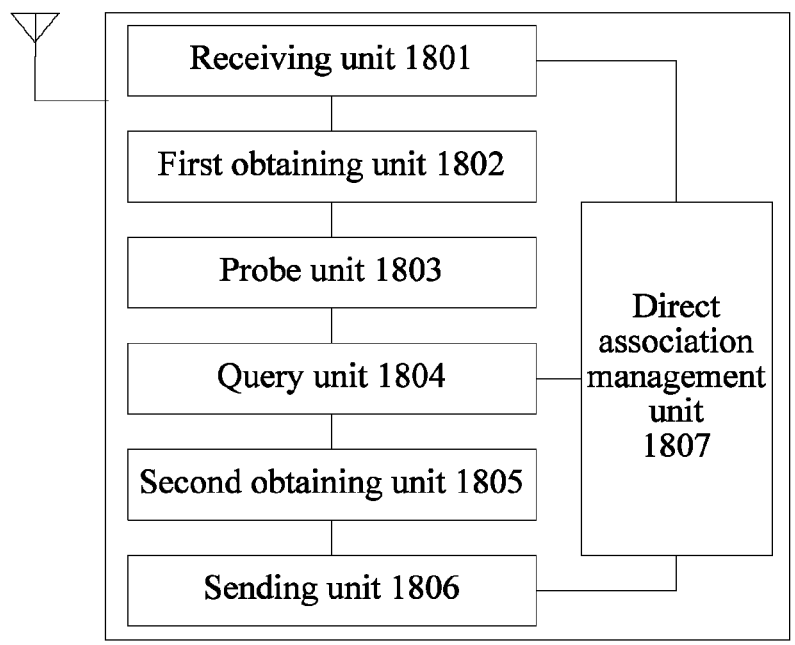

Optionally, as shown in FIG. 18B, the first AP further includes a direct association management unit 1807.

Optionally, the query unit 1804 is further configured to, when the service request state is a second request state, query the direct association service management table of the first AP according to the service name in the direct association service request frame and a device address of the first STA.

The direct association management unit 1807 is configured to, when the service request state in the direct association service request frame is the second request state, and one piece of existing direct association service management information exists in the direct association service management table of the first AP, where a service name in the existing direct association service management information is the same as the service name in the direct association service request frame, and a group address in the existing direct association service management information is the same as the device address of the first STA, delete the existing direct association service management information from the direct association service management table of the first AP.

Optionally, the direct association management unit 1807 is further configured to recycle the group identifier in the existing direct association service management information into a group identifier pool, and recycle a channel resource corresponding to channel information in the existing direct association service management information.

Optionally, the sending unit 1806 is further configured to, after the direct association management unit 1807 updates the direct association service management table, return, to the first STA, an acknowledgment message, for example, ACK or NACK.

It should be noted that, the first AP further includes an antenna configured to send and receive a wireless signal, and the antenna is connected to the receiving unit 1801 and the sending unit 1806.

As shown in FIG. 19, an embodiment of the present invention provides a system for managing a direct association service, where the system includes the first STA shown in FIG. 17 of the present invention and the first AP shown in FIG. 18A of the present invention. The first STA and the first AP perform interaction to search for a second STA that can provide a direct association service, and the first AP manages the direct association service. The system further includes the second STA, and the first STA and the second STA may perform direct communication.

Using the technical solution of obtaining and managing a direct association service provided in this embodiment of the present invention, an AP may serve as a proxy to discover a STA that provides a direct association service and manage direct communication between STAs, and a STA does not need to periodically listen to a request of another device and on a channel, thereby reducing resource consumption and power consumption of the STA.

By adopting the technical solution provided in this embodiment of the present invention, a first AP may serve as a proxy for a first STA to search for service information in a network, and the first AP may provide wider and richer service information to a user through a local search and a remote search, thereby meeting a user's demand of selecting a network according to a service requirement. An AP may serve as a proxy to discover a STA that provides a direct association service and manage direct communication between STAs, so that a STA that provides a service in the network also does not need to periodically listen to a search request of another device and on a channel, thereby reducing resource consumption and power consumption of a STA that provides a service. In addition, the first STA can obtain service information using the first AP both before association and after association, thereby avoiding a problem of frequent association and disassociation between different APs, which occurs because after being associated with an AP, the first STA discovers that a required service does not exist, and is then disassociated. This ensures that a user can more rapidly and accurately access a network that provides a service, and improves user experience. Moreover, the first STA associated with the first AP may declare or cancel service information on the first AP, the first STA does not need to periodically listen to a search request of another device and on a channel, and the first AP may further spread, to an accessible adjacent AP in the network, device information and service information that are declared on the first AP, and may also receive service information provided by an accessible adjacent AP, to provide richer service information to a user. Finally, because service information maintained on an AP is released by a STA that is authenticated and associated with the AP, security is ensured and reliability of a service is further ensured.

A person of ordinary skill in the art may understand that all or some of the steps of the methods in the embodiments may be implemented by a program instructing related hardware. The program may be stored in a computer readable storage medium. The storage medium may include a read-only memory (ROM), a random access memory (RAM), a magnetic disk, or an optical disc.

The foregoing descriptions are merely exemplary implementation manners of the present invention, but are not intended to limit the protection scope of the present invention. Any variation or replacement readily figured out by a person skilled in the art within the technical scope disclosed in the present invention shall fall within the protection scope of the present invention.

What is claimed is:

1. A method for discovering a service in a wireless local area network (WLAN), the method comprising:
    receiving, by a first access point (AP), a service discovery request frame from a first station (STA), wherein the service discovery request frame comprises M service query items, wherein M is an integer greater than or equal to 0, wherein each service query item comprises a query type and query content, and wherein the query type is at least one of: service name, service identifier, device name, device identifier, or device capability;
    querying, by the first AP, a service information table of the first AP according to the M service query items;
    obtaining, by the first AP, first service information that meets the M service query items from the service information table of the first AP, wherein the service information table comprises at least one of: basic service set identifier (BSSID), service name, service identifier, service description, device name, device identifier, or device capability;
    sending, by the first AP, the service discovery request frame to a second AP;
    receiving, by the first AP, a second service discovery response frame from the second AP, wherein the second service discovery response frame comprises second service information that meets the M service query items and is in a service information table of the second AP, and wherein the second AP is an accessible adjacent AP of the first AP;
    obtaining, by the first AP, the second service information from the second service discovery response frame; and
    sending, by the first AP, a first service discovery response frame to the STA, wherein the first service discovery response frame comprises a query result, and wherein the query result comprises the first service information and the second service information.

2. The method according to claim 1, wherein before receiving, by the first AP, the service discovery request frame from the STA, the method further comprises:
    receiving, by the first AP, a probe request frame sent in a broadcast manner from the STA, wherein the probe request frame comprises a service information element in which a Length field is 0; and sending a probe response frame to the STA, wherein the probe response frame comprises the service information element, wherein the service information element comprises a service directory item, and wherein the service directory item comprises at lest one of: the BSSID, the service identifier, or the service name.

3. The method according to claim 1, wherein before receiving, by the first AP, the service discovery request frame from the STA, the method further comprises sending, by the first AP, a beacon frame in a broadcast manner, wherein the beacon frame comprises a service information element, and wherein the service information element comprises a service directory item.

4. The method according to claim 1, wherein M is 0, wherein the first service information comprises all service information in the service information table of the first AP, and wherein the second service information comprises all service information in the service information table of the second AP.

5. A first access point (AP) for discovering a service in a wireless local area network (WLAN), the first AP comprising:
an antenna configured to receive a service discovery request frame from a station (STA), wherein the service discovery request frame comprises M service query items, wherein M is an integer greater than or equal to 0, wherein each service query item comprises a query type and query content, and wherein the query type is at least one of: service name, service identifier, device name, device identifier, or device capability;
a processor coupled to the antenna and configured to:
query a service information table of the first AP according to the M service query items;
obtain first service information that meets the M service query items from the service information table of the first AP, wherein the service information table comprises at least one of: basic service set identifier (BSSID), service name, service identifier, service description, device name, device identifier, or device capability;
send the service discovery request frame to a second AP;
receive a second service discovery response frame from the second AP, wherein the second service discovery response frame comprises second service information that meets the M service query items and is in a service information table of the second AP, and wherein the second AP is an accessible adjacent AP of the first AP; and
obtain the second service information from the second service discovery response frame,
wherein the antenna is further configured to send a first service discovery response frame to the STA,
wherein the first service discovery response frame comprises a query result, and
wherein the query result comprises the first service information and the second service information.

6. The first AP according to claim 5, wherein before receiving the service discovery request frame from the STA, the first AP is further configured to:
receive a probe request frame sent in a broadcast manner from the STA, wherein the probe request frame comprises a service information element in which a Length field is 0; and
send a probe response frame to the STA, wherein the probe response frame comprises the service information element, wherein the service information element comprises a service directory item, and wherein the service directory item comprises at least one of: the BSSID, the service identifier, or the service name.

7. The first AP according to claim 5, wherein before receiving the service discovery request frame from the STA, the first AP is further configured to send a beacon frame in a broadcast manner, wherein the beacon frame comprises a service information element, and wherein the service information element comprises a service directory item.

8. The first AP according to claim 5, wherein M is 0, wherein the first service information comprises all service information in the service information table of the first AP, and wherein the second service information comprises all service information in the service information table of the second AP.

9. A system for discovering a service, comprising:
a first access point (AP) comprising a first antenna and a first processor coupled to the first antenna; and
a second AP comprising a second antenna and a second processor coupled to the second antenna,
wherein the first AP is configured to:
receive a service discovery request frame from a station (STA), wherein the service discovery request frame comprises M service query items, wherein M is an integer greater than or equal to 0, wherein each service query item comprises a query type and query content, and wherein the query type is at least one of: service name, service identifier, device name, device identifier, or device capability;
query a service information table of the first AP according to the M service query items;
obtain first service information that meets the M service query items from the service information table of the first AP, wherein the service information table comprises at least one of: basic service set identifier (BSSID), service name, service identifier, service description, device name, device identifier, or device capability;
send the service discovery request frame to a second AP;
receive a second service discovery response frame from the second AP, wherein the second service discovery response frame comprises second service information that meets the M service query items and is in a service information table of the second AP, and wherein the second AP is an accessible adjacent AP of the first AP;
obtain the second service information from the second service discovery response frame; and
send a first service discovery response frame to the STA, wherein the first service discovery response frame comprises a query result, wherein the query result comprises the first service information and the second service information, and
wherein the second AP is configured to:
receive the service discovery request frame from the first AP;
query the service information table of the second AP according to the service discovery request frame;
obtain the second service information that meets the M service query items from the service information table of the second AP; and
send the second service discovery response frame to the first AP.

10. The system according to claim 9, further comprising the STA.

11. The system according to claim 9, wherein M is 0, wherein the first service information comprises all service information in the service information table of the first AP, and wherein the second service information comprises all service information in the service information table of the second AP.

12. The system according to claim 9, wherein before receiving the service discovery request frame from the STA, the first AP is further configured to:
- receive a probe request frame sent in a broadcast manner from the STA, wherein the probe request frame comprises a service information element in which a Length field is 0; and
- send a probe response frame to the STA, wherein the probe response frame comprises the service information element, wherein the service information element comprises a service directory item, and wherein the service directory item comprises at least one of: the BSSID, the service identifier, or the service name.

13. The system according to claim 9, wherein before receiving the service discovery request frame from the STA, the first AP is further configured to send a beacon frame in a broadcast manner, wherein the beacon frame comprises a service information element, and wherein the service information element comprises a service directory item.

* * * * *